United States Patent
Manolakos et al.

(10) Patent No.: US 12,520,128 B2
(45) Date of Patent: Jan. 6, 2026

(54) COHERENT UPLINK (UL) MULTIPLE-INPUT MULTIPLE-OUTPUT (MIMO)

(71) Applicant: QUALCOMM Incorporated, San Diego, CA (US)

(72) Inventors: Alexandros Manolakos, Escondido, CA (US); Alberto Rico Alvarino, San Diego, CA (US); Timo Ville Vintola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/035,490

(22) PCT Filed: Sep. 20, 2021

(86) PCT No.: PCT/US2021/051125
§ 371 (c)(1),
(2) Date: May 4, 2023

(87) PCT Pub. No.: WO2022/154832
PCT Pub. Date: Jul. 21, 2022

(65) Prior Publication Data
US 2023/0413037 A1 Dec. 21, 2023

(30) Foreign Application Priority Data

Jan. 15, 2021 (GR) ............................... 20210100033

(51) Int. Cl.
*H04W 8/22* (2009.01)
*H04B 7/06* (2006.01)
(Continued)

(52) U.S. Cl.
CPC ............ *H04W 8/22* (2013.01); *H04B 7/0639* (2013.01); *H04L 5/0051* (2013.01); *H04W 72/1268* (2013.01); *H04W 72/231* (2023.01)

(58) Field of Classification Search
CPC .. H04B 7/0404; H04B 7/0639; H04B 7/0689; H04L 5/0051; H04W 8/22; H04W 72/1268; H04W 72/231
See application file for complete search history.

(56) References Cited

U.S. PATENT DOCUMENTS 8,406,333 B2 * 3/2013 Kwon ............... H04L 25/03343
375/267
8,909,308 B2 * 12/2014 Ljung .................. H04B 7/0811
343/876
(Continued)

FOREIGN PATENT DOCUMENTS

CN 110299936 A * 10/2019 ............ H04W 28/04
CN 110299936 B * 9/2021 ........... H04L 5/0048
(Continued)

OTHER PUBLICATIONS

Huawei, et al., "Remaining Issues on UE Adaptation to Maximum MIMO Layers", 3GPP TSG RAN WG1 Meeting #101-e, 3GPP Draft, R1-2003520, 3rd Generation Partnership Project (3GPP), Mobile Competence Centre, 650, Route Des Lucioles, F-06921 Sophia-Antipolis Cedex, France, vol. RAN WG1, No. E-meeting, May 25, 2020-Jun. 5, 2020, 4 Pages, May 16, 2020 (May 16, 2020), XP051885304, pp. 1-4, section 6.
(Continued)

*Primary Examiner* — Eric Nowlin
(74) *Attorney, Agent, or Firm* — Kevin M. Donnelly; Seyfarth Shaw LLP

(57) ABSTRACT

A method for wireless communication by a user equipment (UE) includes transmitting, to a base station, an uplink capability message indicating a coherent uplink multiple-in-multiple-out (MIMO) capability associated with coherent transmission characteristics. The method also includes receiving, from the base station, a switch parameter that configures the UE for a transmission chain switch. The
(Continued)

method further includes receiving, from the base station, a switching message that triggers the transmission chain switch between a reference signal (RS) transmission and a scheduled data communication. The method still further includes transmitting the data communication according to one or more non-coherent transmission characteristics based on the transmission chain switch being triggered between the RS transmission and the scheduled data communication.

30 Claims, 11 Drawing Sheets

(51) Int. Cl.
  *H04L 5/00* (2006.01)
  *H04W 72/1268* (2023.01)
  *H04W 72/231* (2023.01)

(56) References Cited

U.S. PATENT DOCUMENTS

| | | | |
|---|---|---|---|
| 8,924,558 B2 | 12/2014 | Gross | |
| 10,404,337 B1* | 9/2019 | Tan | H04B 7/0469 |
| 10,721,015 B2* | 7/2020 | Rydén | H04W 4/02 |
| 10,778,316 B2* | 9/2020 | Huang | H04B 7/0686 |
| 11,159,221 B2* | 10/2021 | Manolakos | H04B 7/0691 |
| 11,228,410 B2* | 1/2022 | Sun | H04B 7/0626 |
| 11,356,300 B2* | 6/2022 | Huang | H04L 5/0094 |
| 11,463,885 B2* | 10/2022 | Sun | H04B 7/0604 |
| 11,516,755 B2* | 11/2022 | Sridharan | H04B 7/0404 |
| 11,588,595 B2* | 2/2023 | Manolakos | H04B 7/0404 |
| 11,758,412 B2* | 9/2023 | Matsumura | H04B 7/0658 370/329 |
| 11,770,228 B2* | 9/2023 | Brunel | H04L 27/26025 370/329 |
| 11,936,474 B2* | 3/2024 | Zhang | H04W 76/16 |
| 11,979,211 B2* | 5/2024 | Hakola | H04B 7/06956 |
| 12,232,105 B2* | 2/2025 | Huang | H04W 72/1268 |
| 2014/0004802 A1* | 1/2014 | Ljung | H04B 7/0811 455/73 |
| 2014/0301297 A1* | 10/2014 | Geirhofer | H04L 5/0053 370/329 |
| 2018/0183503 A1* | 6/2018 | Rahman | H04B 7/0645 |
| 2019/0068315 A1* | 2/2019 | Rydén | H04B 7/0602 |
| 2019/0312624 A1* | 10/2019 | Huang | H04B 7/0404 |
| 2019/0394733 A1* | 12/2019 | Yang | H04B 7/0404 |
| 2020/0322026 A1* | 10/2020 | Manolakos | H04W 76/27 |
| 2020/0382252 A1* | 12/2020 | Sun | H04B 7/0626 |
| 2021/0022006 A1* | 1/2021 | Sun | H04W 72/23 |
| 2021/0036895 A1* | 2/2021 | Huang | H04B 7/0456 |
| 2021/0051608 A1* | 2/2021 | Sridharan | H04L 27/261 |
| 2021/0058210 A1* | 2/2021 | Manolakos | H04B 7/0617 |
| 2021/0105116 A1* | 4/2021 | Manolakos | H04L 5/0048 |
| 2021/0273691 A1* | 9/2021 | Huang | H04B 7/0473 |
| 2021/0282029 A1* | 9/2021 | Matsumura | H04W 24/10 |
| 2021/0314038 A1* | 10/2021 | Matsumura | H04L 25/0202 |
| 2022/0131636 A1* | 4/2022 | Zhang | H04L 5/0048 |
| 2022/0150035 A1* | 5/2022 | Li | H04L 5/0094 |
| 2022/0224461 A1* | 7/2022 | Lee | H04B 7/0404 |
| 2022/0239352 A1* | 7/2022 | Hakola | H04L 5/0023 |
| 2022/0264471 A1* | 8/2022 | Sun | H04L 5/0051 |
| 2022/0287059 A1* | 9/2022 | Huang | H04W 52/146 |
| 2023/0039595 A1* | 2/2023 | Li | H04B 17/12 |
| 2023/0163819 A9* | 5/2023 | Huang | H04B 7/0469 375/267 |
| 2023/0163918 A1* | 5/2023 | Brunel | H04B 7/0617 370/329 |
| 2023/0224134 A1* | 7/2023 | Li | H04L 5/0048 370/329 |
| 2024/0080225 A1* | 3/2024 | Bengtsson | H04L 25/0224 |
| 2025/0240145 A1* | 7/2025 | Srivastava | H04L 5/0051 |

FOREIGN PATENT DOCUMENTS

| | | | | |
|---|---|---|---|---|
| EP | 3998712 A1 * | 5/2022 | | H04L 5/0048 |
| EP | 3998712 B1 * | 7/2024 | | H04L 5/14 |
| WO | 2019153224 | 8/2019 | | |
| WO | WO-2019153224 A1 * | 8/2019 | | H04B 7/0689 |
| WO | WO-2021004317 A1 * | 1/2021 | | H04L 5/0048 |

OTHER PUBLICATIONS

International Search Report and Written Opinion—PCT/US2021/051125—ISA/EPO—Feb. 28, 2022.
Partial International Search Report—PCT/US2021/051125—ISA/EPO—Jan. 7, 2022.

* cited by examiner

COHERENT UPLINK (UL) MULTIPLE-INPUT MULTIPLE-OUTPUT (MIMO)

CROSS-REFERENCE TO RELATED APPLICATION

The present application claims the benefit to Greece Patent Application No. 20210100033, filed on Jan. 15, 2021, and titled "COHERENT UPLINK (UL) MULTIPLE INPUT MULTIPLE OUTPUT (MIMO)," the disclosure of which is expressly incorporated by reference in its entirety.

FIELD OF THE DISCLOSURE

Aspects of the present disclosure generally relate to wireless communications, and specifically to techniques and apparatuses for applying coherent uplink (UL) multiple-input-multiple-output (MIMO) transmission characteristics.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

A UE may include two or more transmission (Tx) chains to support various multi-antenna techniques including UL MIMO communication. In some examples, a first Tx chain may be associated with a first carrier, such as a time division duplex (TDD) carrier, and a second Tx chain may be associated with a second carrier, such as a frequency division duplex (FDD) carrier. In such examples, a UE may support UL Tx switching to aggregate a first Tx chain, such as a low band Tx chain, with a second Tx chain, such as a high band Tx chain. In some such examples, the first and second Tx chains may be aggregated to support UL MIMO on one carrier, such that a single Tx chain may support two or more UL transmissions. The two or more UL transmissions may be an example of a concurrent or coherent transmission. In some examples, a coherent transmission may be associated with coherent transmission characteristics.

SUMMARY

The systems, methods, and devices of this disclosure each have several innovative aspects, no single one of which is solely responsible for the desirable attributes disclosed herein.

In one aspect of the present disclosure, a method for wireless communication by a user equipment (UE) is disclosed. The method includes transmitting, to a base station, an uplink capability message indicating a coherent uplink multiple-in-multiple-out (MIMO) capability associated with coherent transmission characteristics. The method further includes receiving, from the base station, a switch parameter that configures the UE for a transmission chain switch. The method still further includes receiving, from the base station, a switching message that triggers the transmission chain switch between a reference signal (RS) transmission and a scheduled data communication. The method also includes transmitting the data communication according to one or more non-coherent transmission characteristics based on the transmission chain switch being triggered between the RS transmission and the scheduled data communication.

Another aspect of the present disclosure is directed to an apparatus for wireless communication at a UE. The apparatus includes means for transmitting, to a base station, an uplink capability message indicating a coherent uplink MIMO capability associated with coherent transmission characteristics. The apparatus further includes means for receiving, from the base station, a switch parameter that configures the UE for a transmission chain switch. The apparatus still further includes means for receiving, from the base station, a switching message that triggers the transmission chain switch between an RS transmission and a scheduled data communication. The apparatus also includes means for transmitting the data communication according to one or more non-coherent transmission characteristics based on the transmission chain switch being triggered between the RS transmission and the scheduled data communication.

In another aspect of the present disclosure, a non-transitory computer-readable medium with non-transitory program code recorded thereon for wireless communication at a UE is disclosed. The program code is executed by a processor and includes program code to transmit, to a base station, an uplink capability message indicating a coherent uplink MIMO capability associated with coherent transmission characteristics. The program code further includes program code to receive, from the base station, a switch parameter that configures the UE for a transmission chain switch. The program code still further includes program code to receive, from the base station, a switching message that triggers the transmission chain switch between an RS transmission and a scheduled data communication. The program code also includes program code to transmit the data communication according to one or more non-coherent transmission characteristics based on the transmission chain switch being triggered between the RS transmission and the scheduled data communication.

Another aspect of the present disclosure is directed to an apparatus for wireless communication at a UE. The apparatus includes a processor, a memory coupled with the processor, and instructions stored in the memory and operable, when executed by the processor, to cause the apparatus to transmit, to a base station, an uplink capability message indicating a coherent uplink MIMO capability associated with coherent transmission characteristics. Execution of the instructions also cause the apparatus to receive, from the base station, a switch parameter that configures the UE for a transmission chain switch. Execution of the instructions further cause the apparatus to receive, from the base station, a switching message that triggers the transmission chain switch between an RS transmission and a scheduled data communication. Execution of the instructions still further cause the apparatus to transmit the data communication according to one or more non-coherent transmission characteristics based on the transmission chain switch being triggered between the RS transmission and the scheduled data communication.

In one aspect of the present disclosure, a method for wireless communication by a base station. The method includes receiving, from a UE, an uplink capability message indicating a coherent uplink MIMO capability, at the UE, associated with coherent transmission characteristics. The method further includes transmitting, to the UE, a switch parameter that configures the UE for a transmission chain switch. The method still further includes transmitting, to the UE, a switching message that triggers the transmission chain switch between an RS transmission and a scheduled data communication. The method also includes receiving, from the UE, the data communication according to one or more non-coherent transmission characteristics based on transmitting the switching message.

Another aspect of the present disclosure is directed to an apparatus for wireless communication at a base station. The apparatus includes means for receiving, from a UE, an uplink capability message indicating a coherent uplink MIMO capability, at the UE, associated with coherent transmission characteristics. The apparatus further includes means for transmitting, to the UE, a switch parameter that configures the UE for a transmission chain switch. The apparatus still further includes means for transmitting, to the UE, a switching message that triggers the transmission chain switch between an RS transmission and a scheduled data communication. The apparatus also includes means for receiving, from the UE, the data communication according to one or more non-coherent transmission characteristics based on transmitting the switching message.

In another aspect of the present disclosure, a non-transitory computer-readable medium with non-transitory program code recorded thereon for wireless communication at a base station is disclosed. The program code is executed by a processor and includes program code to receive, from a UE, an uplink capability message indicating a coherent uplink MIMO capability, at the UE, associated with coherent transmission characteristics. The program code further includes program code to transmit, to the UE, a switch parameter that configures the UE for a transmission chain switch. The program code still further includes program code to transmit, to the UE, a switching message that triggers the transmission chain switch between an RS transmission and a scheduled data communication. The program code also includes program code to receive, from the UE, the data communication according to one or more non-coherent transmission characteristics based on transmitting the switching message.

Another aspect of the present disclosure is directed to an apparatus for wireless communication at a base station. The apparatus includes a processor, a memory coupled with the processor, and instructions stored in the memory and operable, when executed by the processor, to cause the apparatus to receive, from a UE, an uplink capability message indicating a coherent uplink MIMO capability, at the UE, associated with coherent transmission characteristics. Execution of the instructions also cause the apparatus to transmit, to the UE, a switch parameter that configures the UE for a transmission chain switch. Execution of the instructions further cause the apparatus to transmit, to the UE, a switching message that triggers the transmission chain switch between an RS transmission and a scheduled data communication. Execution of the instructions still further cause the apparatus to receive, from the UE, the data communication according to one or more non-coherent transmission characteristics based on transmitting the switching message.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying Figures. Each of the Figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
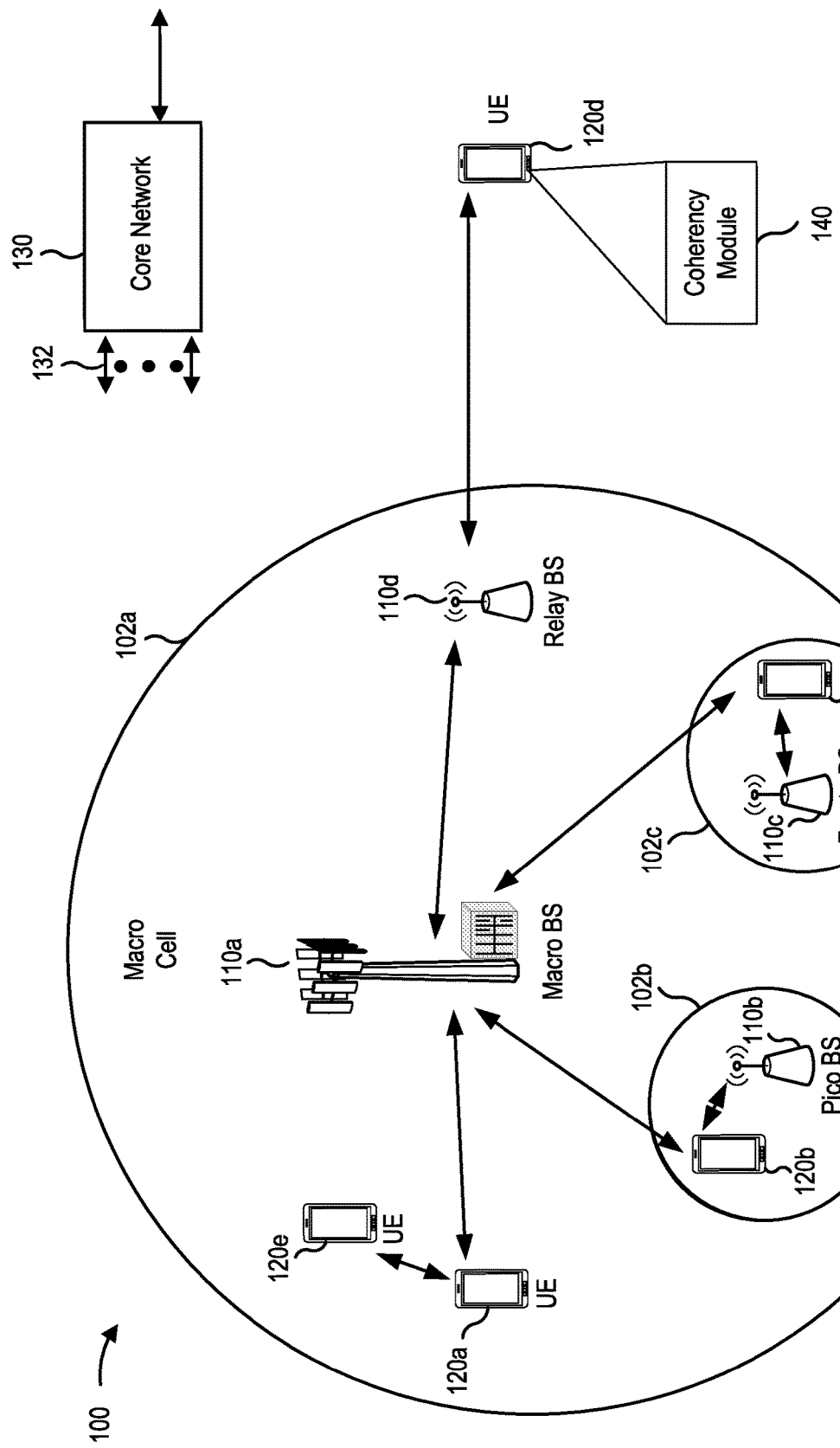
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and 4G technologies.

As described, a user equipment (UE) may include two or more transmission (Tx) chains to support uplink (UL) multiple-input multiple-output (MIMO) communication. In some examples, a UE may support UL Tx switching to aggregate a first Tx chain, such as a low band Tx chain, with a second Tx chain, such as a high band Tx chain. In some such examples, the first and second Tx chains may be aggregated to support UL MIMO on a single carrier, such that the single carrier may support two or more UL transmissions. The two or more UL transmissions may be an example of a concurrent or coherent transmission because the two or more UL transmissions may be transmitted via the same carrier. A coherent transmission may be associated with coherent transmission characteristics. In some other examples, a base station may trigger a Tx chain switch at the UE, such that that one Tx chain of multiple Tx chains associated with one carrier may be shared with another carrier. In some such examples, the UE may no longer support the coherent transmission as a result of the Tx chain switch.

Aspects of the present disclosure are directed to applying coherent transmission characteristics or non-coherent transmission characteristics to a UL transmission based on a timing of a transmission chain switch. In some examples, a UE may indicate, to a base station, a coherent uplink MIMO capability associated with coherent transmission characteristics. In some examples, the base station may configure the UE with a transmission chain switch capability based on the UE indicating the coherent uplink MIMO capability. The base station may schedule a communication as a coherent UL MIMO transmission (associated with coherent transmission characteristics) based on the UE's reported UL MIMO capability.

The base station may trigger a transmission chain switch between a reference signal (RS) transmission and a scheduled data communication, such as a physical uplink shared channel (PUSCH) communication or a physical sidelink shared channel (PSSCH) communication. In some examples, the RS transmission may be a previous RS transmission or a scheduled RS transmission. Based on the transmission chain switch being triggered between the RS transmission and the scheduled data communication, the UE may not expect to receive a coherent transmitted precoding matrix indicator (TPMI) associated with the coherent transmission characteristics. As a result, the base station may refrain from transmitting, to the UE, the coherent TPMI associated with the coherent transmission characteristics. Rather, the base station may transmit, to the UE, a non-coherent TPMI associated with one or more non-coherent transmission characteristics. The UE may then transmit the data communication according to one or more non-coherent transmission characteristics associated with the non-coherent TPMI based on the transmission chain switch being triggered between the RS transmission and the scheduled data communication.

Particular aspects of the subject matter described in this disclosure can be implemented to realize one or more of the following potential advantages. In some examples, the described techniques may reduce communication errors caused by the receiver (for example, base station) expecting a coherent UL MIMO transmission when the UE cannot perform the coherent UL MIMO transmission, among other advantages. In such examples, the communication errors may be reduced by providing criteria for determining whether a scheduled transmission chain switch may prevent the coherent UL MIMO transmission.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and the like. Each BS may provide communications coverage for a particular geographic area. In 3GPP, the term "cell" can refer to a coverage area of a BS and a BS subsystem serving this coverage area, depending on the context in which the term is used.

A BS may provide communications coverage for a macro cell, a pico cell, a femto cell, and another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and to one or more other BSs or network nodes (not shown) in the wireless network 100 through various types of backhaul interfaces such as a direct physical connection, a virtual network, and the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and the like.

The wireless network 100 may be a heterogeneous network that includes BSs of different types, for example, macro BSs, pico BSs, femto BSs, relay BSs, and the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a coherency module 140. For brevity, only one UE 120d is shown as including the coherency module 140. The coherency module 140 may transmit, to a base station, an uplink capability message indicating a coherent uplink MIMO capability associated with coherent transmission characteristics. The coherency module 140 may also receive, from the base station, a switch parameter that configures the UE for a transmission chain switch. The coherency module 140 may further receive, from the base station, a switching message that triggers the transmission chain switch between a RS transmission and a scheduled data communication. The coherency module 140 may also transmit the data communication according to one or more non-coherent transmission characteristics based on the transmission chain switch being triggered between the RS transmission and the scheduled data communication.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and may be implemented as NB-IoT (narrowband internet of things) devices. Some UEs may be considered a customer premises equipment (CPE). UE 120 may be included inside a housing that houses components of UE 120, such as processor components, memory components, and the like.

In general, any number of wireless networks may be deployed in a given geographic area. Each wireless network may support a particular radio access technology (RAT) and may operate on one or more frequencies. A RAT may also be referred to as a radio technology, an air interface, and the like. A frequency may also be referred to as a carrier, a frequency channel, and the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and the like), a mesh network, and the like. In this case, the UE 120 may perform scheduling operations, resource selection operations, and other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
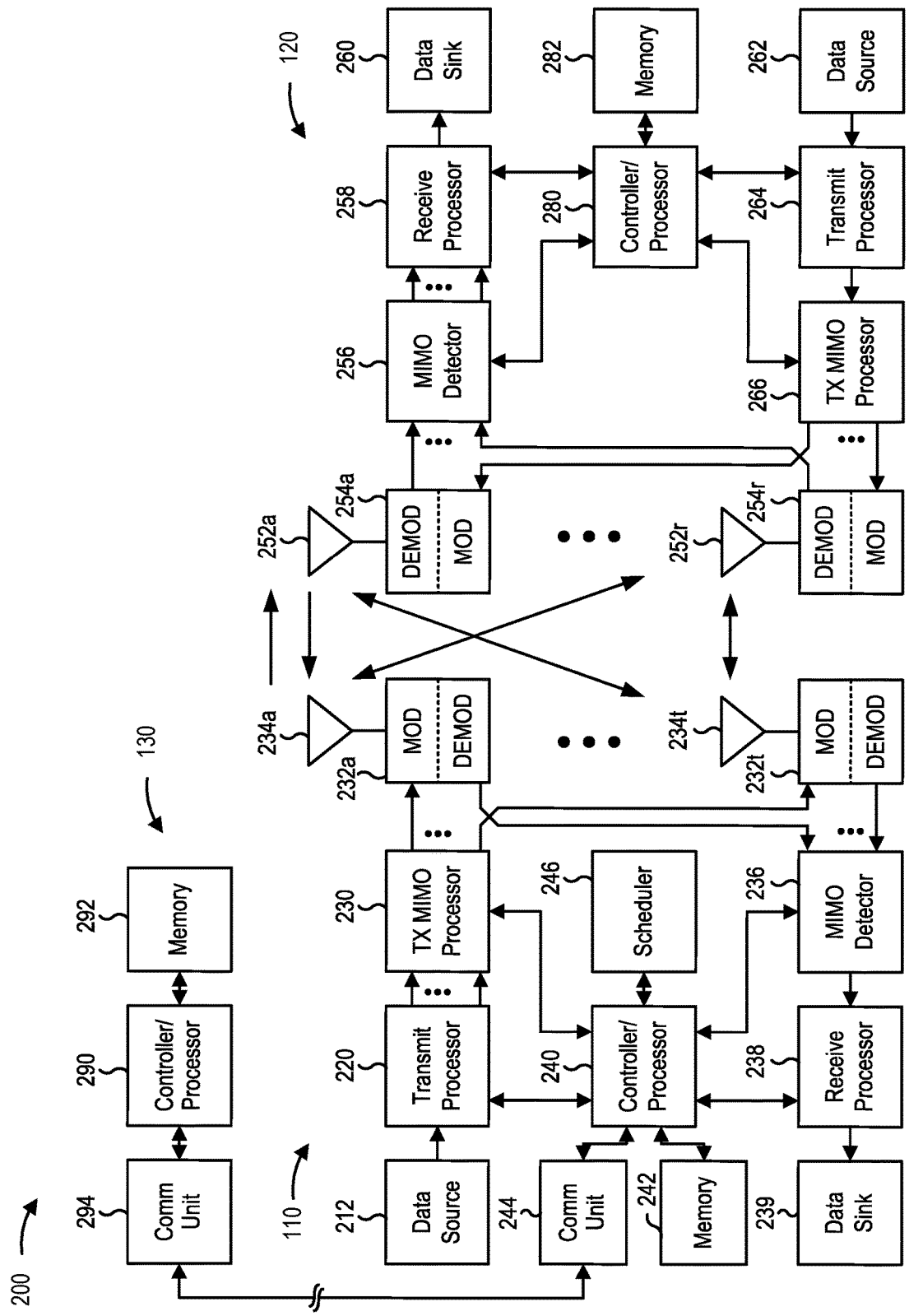
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and the like) and control information (for example, CQI requests, grants, upper layer signaling, and the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and the reference symbols, if applicable, and may provide T output symbol streams to T modulators (MODs) 232a through 232t. Each modulator 232 may process a respective output symbol stream (for example, for OFDM and the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and any other component(s) of FIG. 2 may perform one or more techniques associated with transmitting an uplink communication with coherent transmission characteristics, as described in more detail elsewhere. For example, the controller/processor 240 of the base station 110, the controller/processor 280 of the UE 120, and any other component(s) of FIG. 2 may perform or direct operations of, for example, the process of FIG. 9 and other processes as described. Memories 242 and 282 may store data and program codes for the base station 110 and UE 120, respectively. A scheduler 246 may schedule UEs for data transmission on the downlink and uplink.

In some examples, a UE supports two or more transmission (Tx) chains. In one such example, a first Tx chain may be associated with a first carrier, such as a time division duplex (TDD) carrier, and the second Tx chain may be associated with a second carrier, such as a frequency division duplex (FDD) carrier. In such examples, a UE may support UL Tx switching to aggregate a Tx chain on a first band, such as the FDD carrier, with a Tx chain on a second band, such as the TDD carrier. The aggregated Tx chains may support UL MIMO on the second band. That is, the UE may dynamically switch one Tx chain from one carrier and share the Tx chain with the other carrier. In some examples, the first band may be a low band and the second band may be a high band. The Tx chain switch may result in two or more Tx chains on a single carrier. The two or more UL transmissions may be an example of concurrent or coherent transmission. Reference signals (RSs) and communications scheduled for coherent transmission may be transmitted with coherent transmission characteristics from multiple antenna ports of the UE.

Figure 3:
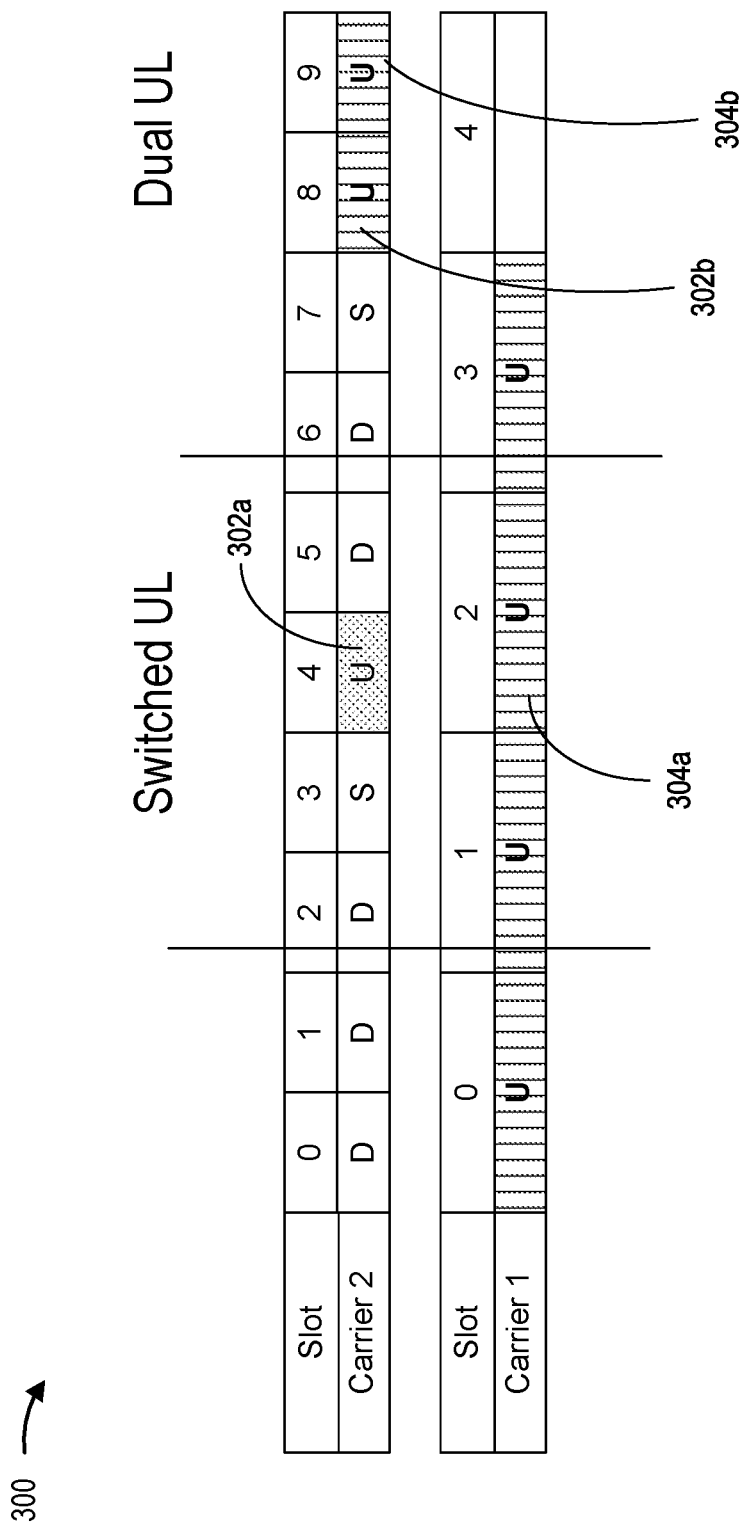
FIG. 3 is a diagram illustrating an example of transmission (Tx) chain switching, in accordance with aspects of the present disclosure.

In some examples, a UE may communicate with a base station on two or more carriers. FIG. 3 is a block diagram 300 illustrating an example of Tx chain switching, in accordance with aspects of the present disclosure. In the example of FIG. 3, the UE, such as the UE 120 shown in FIG. 1, supports two Tx chains. As shown in FIG. 3, the UE performs UL transmissions on both a first carrier, shown as Carrier 1, and a second carrier, shown as Carrier 2. In the example of FIG. 3, the first carrier is an example of an FDD carrier and the second carrier is an example of a TDD carrier. Aspects of the present disclosure are not limited to FDD and TDD carriers; other types of carriers are contemplated. Additionally, aspects of the present disclosure are not limited to UEs with two Tx chains. In some aspects, a UE may support two or more Tx chains.

As shown in FIG. 3, different subcarrier spacing may be specified for each carrier. In some examples, each slot of the first carrier is 1 ms and each slot of the second carrier is 0.5 ms. In the example of FIG. 3, the UE may operate in two modes. In a first mode, a first Tx chain 302a is dedicated to the second carrier and a second Tx chain 304a is dedicated to the first carrier. In the example of FIG. 3, the first Tx chain 302a may be a single-port transmission. In some examples, the first mode may be referred to as a switchedUL mode. In a second mode, both a first Tx chain 302b and a second Tx chain 304b are dedicated to the second carrier. In some examples, the second mode may be referred to as dualUL. In some such examples, transmissions via the first Tx chain 302b and the second Tx chain 304b may be full rank transmissions. Based on the full rank transmission capability, the UE may support coherent UL MIMO in the second mode. Furthermore, the second mode may be for carrier aggregation with the first carrier and the second carrier. Additionally, the second mode may be for evolved universal mobile telecommunications system (UMTS) terrestrial radio access network (E-UTRAN)-new radio dual connectivity (ENDC) with and without supplementary uplink (SUL). A switch from the first mode to the second mode and a switch from the second mode to the first mode are examples of Tx chain switches or component carrier switches.

In some examples, the second carrier may operate on an n78 band (3500 MHz) and the first carrier may operate on an n1 band (2100 MHz). The UE may support UL MIMO on the second carrier with two or more Tx chains. That is, the UE may switch one Tx chain from the first carrier to the second carrier to support multiple Tx chains on the second carrier. The UE may perform the Tx switch to support multiple Tx chains on a carrier when a size of the UL MIMO transmission is larger than the Tx chain allocated to the carrier prior to the Tx switch.

As previously described, the UE may operate in a first mode (for example, switchedUL) and a second mode (for example, dualUL). For inter-band or intra-band UL carrier aggregation (CA), the UE may report support for UL Tx switching via capability signaling. In some examples, the UE may also report, via capability signaling, whether the first mode or second mode is supported.

The first mode may include different transmission scenarios (shown as Case 1 and Case 2 in Table 1). Table 1 shows the Tx chain and antenna port allocation for each transmission scenario. In the example of Table 1, for Case 1, one Tx chain is dedicated to the first carrier (carrier 1) and another Tx chain is dedicated to the second carrier (carrier 2). In some examples, for Case 1, if UL Tx switching is configured, UL transmissions may not be scheduled on the second carrier. Thus, as shown in Table 1, for Case 1, a number of antenna ports allocated to the second carrier may be zero (OP). Additionally, for Case 2, two Tx chains may be dedicated to the second carrier. In such examples, one or two antenna ports may be allocated to the second carrier for UL transmission.

TABLE 1

|  | Number of Tx chains (carrier 1 + carrier 2) | Number of antenna ports for UL transmission (carrier 1 + carrier 2) |
|---|---|---|
| Case 1 | 1T + 1T | 1P + 0P |
| Case 2 | 0T + 2T | 0P + 2P, 0P + 1P |

The second mode also includes different transmission scenarios (shown as Case 1 and Case 2 in Table 2). Table 2 shows the Tx chain and antenna port allocation for each transmission scenario. In some examples, for the second mode, the UE may schedule UL transmission on both the first and second carriers for Case 1 if UL Tx switching is configured. That is, for Case 1, a Tx chain may be dedicated to each carrier. Additionally, as shown in Table 2, for Case 1, the UE may schedule an UL transmission only on the first carrier (1P+0P), only on the second carrier (0P+1P), or on both the first and second carriers (1P+1P). The antenna port assignment may be indicative of the scheduled UL transmission. Alternatively, as shown in Table 2, for Case 2, two Tx chains may be dedicated to the second carrier. In such examples, one or two antenna ports may be allocated to the second carrier for UL transmission.

TABLE 2

| | Number of Tx chains (carrier 1 + carrier 2) | Number of antenna ports for UL transmission (carrier 1 + carrier 2) |
|---|---|---|
| Case 1 | 1T + 1T | 1P + 0P, 1P + 1P, 0P + 1P |
| Case 2 | 0T + 2T | 0P + 2P, 0P + 1P |

As described, the UE may indicate its UL Tx switching capability to the network (for example, base station). In some examples, the network may transmit a switch capability configuration to configure a Tx chain switch based on the UE indicating its UL Tx switching capability. The UL Tx switching capability may be based on the format provided in Table 3.

TABLE 3

```
BandCombinationList-UplinkTxSwitch-r16 ::= SEQUENCE (SIZE
(1..maxBandComb)) OF BandCombination-UplinkTxSwitch-r16
BandCombination-UplinkTxSwitch-r16 ::= SEQUENCE {
[..]
    supportedBandPairListNR-r16     SEQUENCE (SIZE
(1.. maxULTxSwitchingBandPairs)) OF ULTxSwitchingBandPair-r16,
    uplinkTxSwitching-OptionSupport-r16 ENUMERATED {switchedUL, dualUL,
both} OPTIONAL, (Supported mode of operation)
    ...
}
ULTxSwitchingBandPair-r16 ::=   SEQUENCE {
    bandIndexUL1-r16           INTEGER(1..maxSimultaneousBands), (bands
between which the UE can switch)
    bandIndexUL2-r16           INTEGER(1..maxSimultaneousBands),
    uplinkTxSwitchingPeriod-r16    ENUMERATED {n35us, n140us, n210us},
(length of switch)
    uplinkTxSwitching-DL-Interruption-r16 BIT STRING
(SIZE(1..maxSimultaneousBands)) OPTIONAL (signal which bands this switch will
interrupt)
}
    Cell GroupConfig ::=           SEQUENCE
    [...]
      uplinkTxSwitchingOption-r16     ENUMERATED {switchedUL,
    dualUL}                 OPTIONAL -- Need R (configuration of Tx
    Switching - it can be switchedUL or dualUL)
    ]]
```

In the example of Table 3, the uplinkTxSwitching-OptionSupport-r16 element indicates whether the UE supports the switchedUL mode, the dualUL mode, or both the switchedUL mode and the dualUL. The uplinkTxSwitching-Period-r16 may indicate a length of time to perform the switch. The length of time may be measured in microseconds. Additionally, bandIndexUL1-r16 and bandIndexUL2-r16 may indicate the switching bands. That is, the UE may indicate it is switching from a first band (bandIndexUL1-r16) to a second band (bandIndexUL2-r16). The uplinkTx-Switching-DL-Interruption-r16 element identifies one or more bands that may be interrupted due to the switch from the first band (bandIndexUL1-r16) to the second band (bandIndexUL2-r16).

As described, some aspects of the present disclosure are directed to coherent UL MIMO. In some examples, a UE may schedule a reference signal transmission via two or more ports. In some such examples, a communication via two or more ports may be scheduled following the reference signal transmission. The reference signal and the communication may be scheduled on the same carrier and two or more Tx chains may be dedicated to the carrier. In some such examples, the reference signal and the communication may be transmitted based on coherent transmission characteristics.

Examples of coherent transmission characteristics for coherent UL MIMO are defined in 3GPP Rel-15 (38.101). In some such examples, the coherent transmission characteristics define a maximum allowable difference between a first relative power and a second relative power, and a first phase error and a second phase error. In some examples, the maximum allowable difference of relative phase error may be forty degrees. Additionally, in some examples, the maximum allowable difference of relative power error may be four decibels (dB). The first relative power and the first phase error are measured based on a last transmitted reference signal (RS) on a set of antenna ports. The second relative power and the second phase error correspond to an uplink transmission on the same set of ports as the last transmitted RS, where the uplink transmission is scheduled within a defined time window, such as twenty seconds. In some examples, the uplink transmission may be a physical uplink shared channel (PUSCH) or a physical sidelink shared channel (PSSCH). Additionally, in some examples, the RS may be a sounding reference signal (SRS), a sidelink (SL) SRS, or a SL channel state information (CSI) RS. In some examples, the coherent transmission characteristics may apply when the UL transmission power at each antenna port is greater than 0 dBm for the RS transmission and for the duration of a time window.

In some such examples, the coherent transmission characteristics are applied to the coherent UL MIMO transmissions (for example, the RS transmission and the data communication) when each condition of a set of conditions is satisfied within the designated time window. In some examples, one condition of the set of conditions specifies that a change in a number of SRS ports in an SRS-configuration, or a change in a PUSCH-configuration, is not signaled to the UE during the designated time window. A second condition specifies for the UE to remain in a discontinuous reception (DRX) active time (for example, the UE does not enter DRX OFF time) during the designated time window. A third condition specifies that a measurement gap does not occur during the designated time window. A fourth condition specifies that an instance of an SRS transmission does not switch usage antenna during the designated time window. A fifth condition specifies for an active bandwidth part (BWP) to remain the same during the designated time window. Finally, a sixth condition specifies that ENDC and CA configurations are not changed for the UE (for example, the UE is not configured or de-configured with the primary service cell (PCell) or secondary cell(s) (SCell(s)) during the designated time window.

As described, a Tx chain switch may be triggered to switch a Tx chain from one carrier to another carrier. A component carrier switch may be an example of a Tx chain switch. The set of conditions applied to conventional coherent UL MIMO scenarios does not account for the Tx chain switch. Therefore, it may be desirable to add a condition to account for a Tx chain switch scheduled before or after the RS transmission and before the communication of the coherent UL MIMO transmission. In some implementations, in addition to the set of conditions described above, the coherent transmission characteristics may be applied to the coherent UL MIMO transmissions when a switching occurrence is not scheduled between a last transmitted RS and a scheduled transmission for two or more antenna ports with coherent transmission characteristics. That is, the coherent transmission characteristics may be applied when a switching occurrence indicated by an uplinkTxSwitchingPeriod-Location element is not located between a last transmitted RS (for example, SRS) and a scheduled transmission for two or more antenna ports with coherent, or partially coherent, transmitted precoding matrix indicators (TPMIs). A coherent transmission characteristic may be based on a TPMI.

Additionally, in some implementations, the fourth condition described above may be updated to account for SRS transmissions to carriers without a corresponding PUSCH (for example, PUSCH-less carriers). That is, in some examples, the fourth condition described above may specify that an instance of an SRS transmission does not switch usage antenna during the designated time window, and an SRS is not transmitted to a PUSCH-less carrier during the designated time window. Aspects of the present disclosure are not limited to the set of conditions described above, additional or alternative conditions may be specified.

In some examples, the switching time mask is applicable for an uplink band pair of an inter-band UL CA configuration when the capability uplinkTxSwitchingPeriod is present. In some such examples, the time mask corresponds to the switching period. The switching period may be an example of a time period during which a transition is happening and defines how much each symbol before and after a transition are affected because of the switching. In some other examples, the switching time mask may be applicable for uplink switching mechanisms where a first UL carrier is capable of one transmit antenna connector and a second UL carrier is capable of two transmit antenna connectors with three dB boosting on the maximum output power when the capability uplinkTxSwitchingPowerBoosting is present, and the information element (IE) powerboostingTxSwitching is set to one, and the two uplink carriers are in different bands with different carrier frequencies. The UE shall support the switch between single layer transmission with one antenna port and two-layer transmission with two antenna ports on the two uplink carriers following the scheduling commands and rank adaptation (for example, both single layer and two-layer transmission with two antenna ports, and single layer transmission with one antenna port shall be supported on the second UL carrier).

As described, aspects of the present disclosure are directed to determining whether a transmission chain switch or component carrier switch is scheduled between a reference signal (RS) scheduled for transmission or transmitted by the UE and a communication, such as a data communication, scheduled for transmission with coherent transmission characteristics by multiple antenna ports of the UE. Additionally, aspects of the present disclosure transmit the communication based on one or more non-coherent transmission characteristics in response to determining the transmission chain switch or the or component carrier switch is scheduled.

Figure 4:
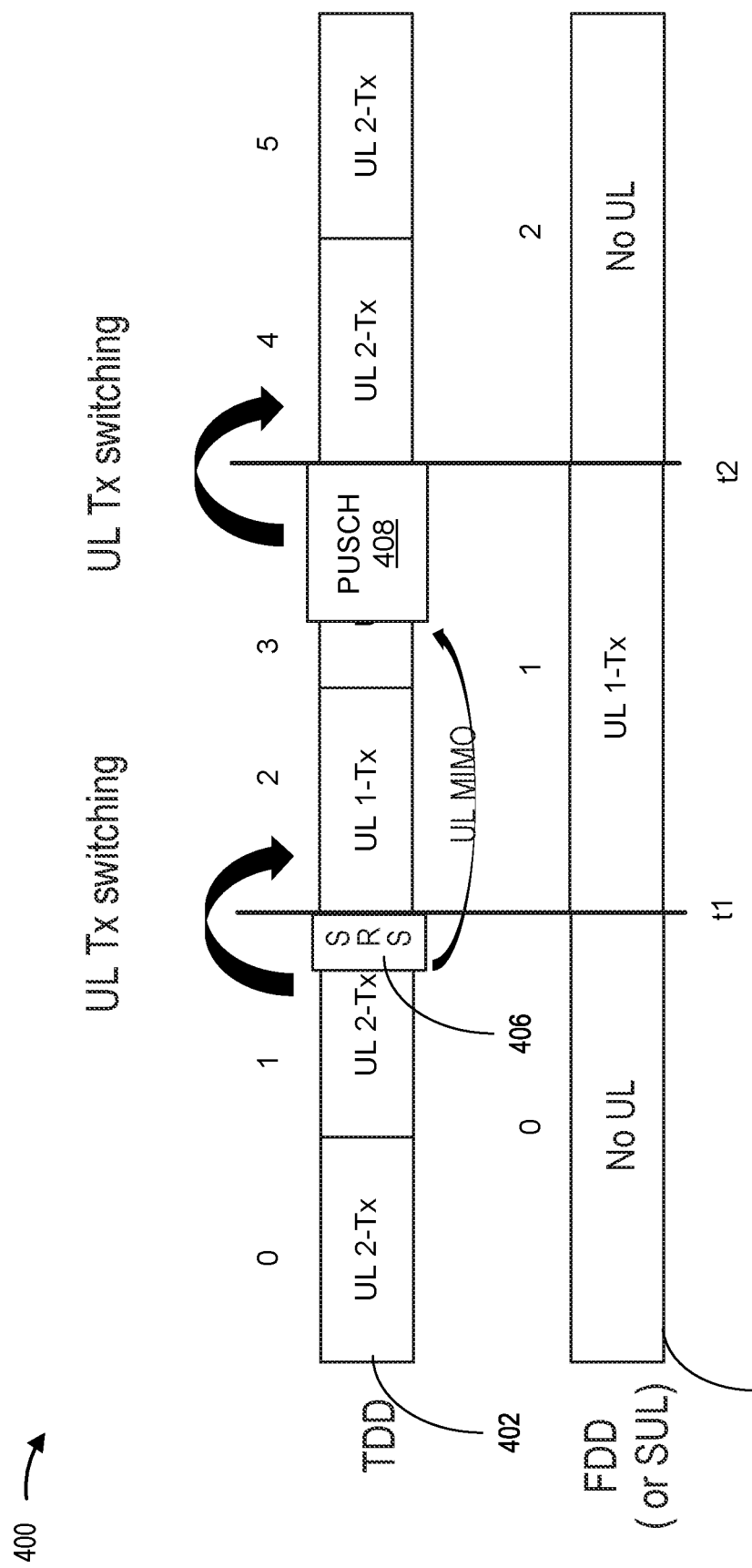
FIG. 4 is a block diagram illustrating an example of Tx chain switching, in accordance with aspects of the present disclosure.

FIG. 4 is a block diagram 400 illustrating an example of Tx chain switching, in accordance with aspects of the present disclosure. In the example of FIG. 4, a UE (not shown in FIG. 4) may transmit on two carriers 402, 404. Additionally, the UE of FIG. 4 may support two Tx chains. In some examples, the first carrier 402 may be a TDD carrier, and the second carrier 404 may be an FDD carrier or an SUL carrier. In the example of FIG. 4, it is assumed the UE has reported coherent UL MIMO capability in the first carrier 402 and the base station has transmitted a switch capability configuration to configure the UE with a transmission chain switch capability based on the UE indicating the coherent UL MIMO capability. Aspects of the present disclosure are not limited to two carriers 402, 404 operating in different bands. In some examples, the carriers 402, 404 may operate on the same band.

As shown in FIG. 4, prior to time t1, the UE dedicates two UL Tx chains (shown as UL 2-Tx) to slots 0 and 1 of the first carrier 402. Thus, an SRS 406 may be a multi-antenna port (for example, two ports) SRS transmission. Additionally, in the example of FIG. 4, a PUSCH 408 transmission is scheduled at slot 3 of the first carrier 402. In the current example, a time difference between the SRS 406 and the PUSCH 408 may be less than or equal to a time window designated for coherent UL MIMO. Furthermore, in the example of FIG. 4, it is assumed that a PUSCH configuration and an SRS configuration do not change between the SRS 406 and the PUSCH 408. Therefore, the UE may satisfy the set of conditions for a coherent UL MIMO transmission. That is, the SRS 406 and the PUSCH 408 may be scheduled for transmission from the same set of antenna ports with coherent transmission characteristics. As described, the coherent transmission characteristics may set a first maximum allowable difference between a first phase and a second phase. Additionally, the coherent transmission characteristics may set a second maximum allowable difference between a first power error and a second power error. In some examples, the first phase and the first power error correspond to the PUSCH 408, and the second phase and the second power error correspond to the SRS 406.

Still, in the example of FIG. 4, the UE may not perform the coherent UL MIMO transmission because the UE performs a first Tx chain switch at time t1. In some examples, the first Tx chain switch may be performed based on a trigger received from a base station. In such examples, the trigger may be an implicit trigger or an explicit trigger. The trigger may be an example of a transmission switch indicator. In some examples, the implicit trigger may be a request to perform a rank transmission on the first carrier 402 or the second carrier 404. In such examples, the rank transmission may be performed when one of the two UL Tx chains from the first carrier 402 to the second carrier 404. In other examples, the explicit trigger may be radio resource control (RRC) based signaling, medium access control (MAC) control element (CE) based signaling, or downlink control information (DCI) based signaling.

In the example of FIG. 4, the UE dedicates one of the Tx chains (1-Tx) from the first carrier 402 to the second carrier 404 after performing the first Tx chain switch. The UE may perform a single-port UL transmission at slot 1 of the second carrier 404 based on switching one Tx chain from the first carrier 402 to the second carrier 404. Following the first Tx chain switch, one of the two Tx chains is dedicated to the first carrier 402. Based on the Tx switch (time t1), the scheduled PUSCH 408 may be transmitted via a single antenna port. In such examples, the UE cannot transmit a single-port PUSCH with the coherent transmission characteristics associated with a TPMI that assume coherent capability. In such examples, the UE also does not expect to receive the TPMI associated with the coherent transmission characteristics based on a timing of the first Tx switch. In the example of FIG. 4, the PUSCH 408 may be transmitted with one or more non-coherent transmission characteristics that exclude one or both of the first maximum allowable difference or the second maximum allowable difference set by the coherent transmission characteristics. Finally, as shown in FIG. 4, at time t2, the UE may perform a second UL Tx switch to dedicate both Tx chains to the first carrier 402. The second UL Tx switch may not mitigate the UE's inability to perform a coherent UL MIMO transmission due to the first UL Tx switch.

Figure 5:
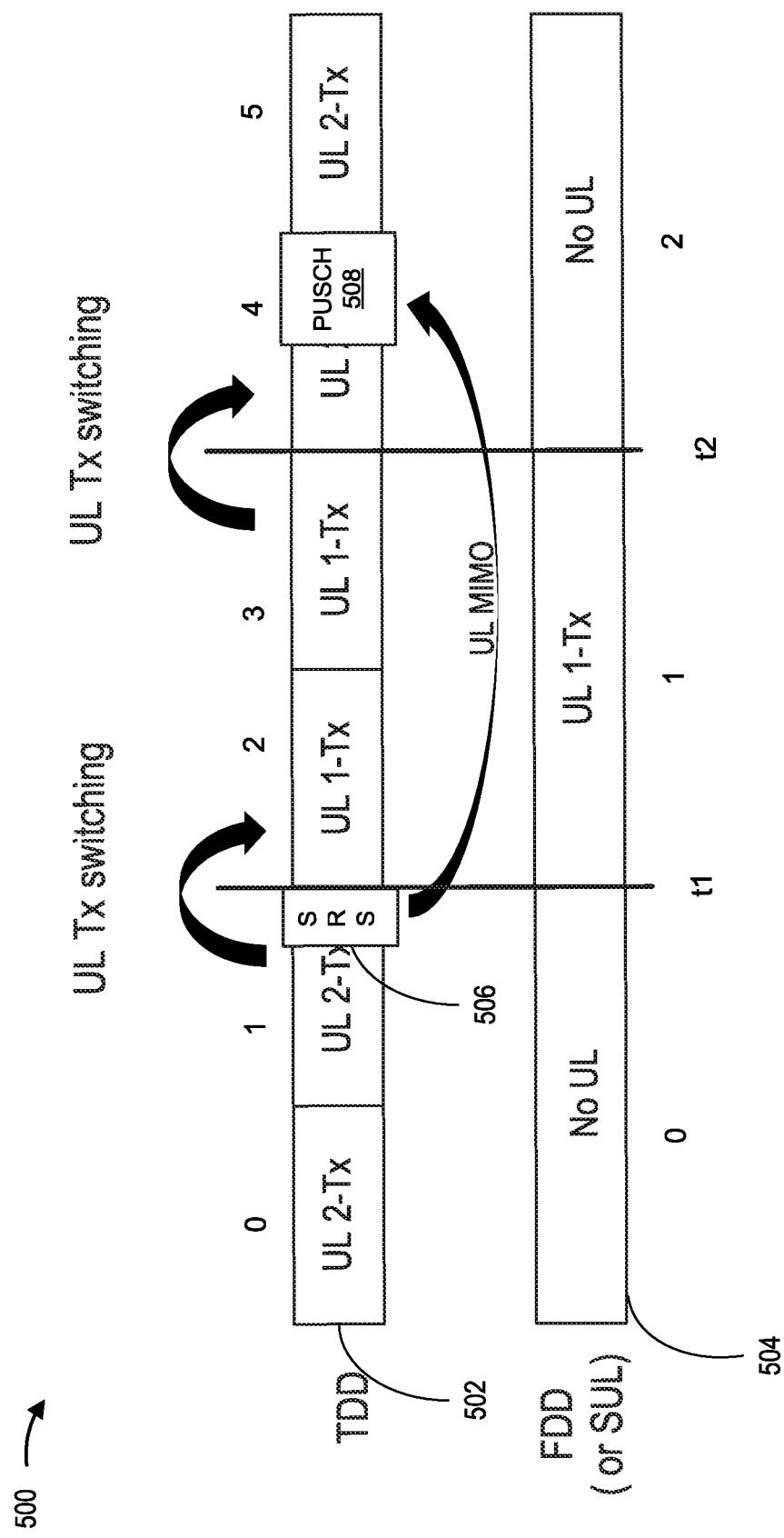
FIG. 5 is a block diagram illustrating an example of Tx chain switching, in accordance with aspects of the present disclosure.

FIG. 5 is a block diagram 500 illustrating an example of Tx chain switching, in accordance with aspects of the present disclosure. In the example of FIG. 5, a UE (not shown in FIG. 5) may transmit on two carriers 502, 504. Additionally, the UE of FIG. 5 may support two Tx chains. In some examples, the first carrier 502 may be a TDD carrier, and the second carrier 504 may be an FDD carrier or an SUL carrier. In the example of FIG. 5, it is assumed the UE has reported UL coherent MIMO capability in the first carrier 502.

As shown in FIG. 5, prior to time t1, the UE dedicates two UL Tx chains (shown as UL 2-Tx) to slots 0 and 1 of the first carrier 502. Thus, an SRS 506 may be a multi-antenna port (for example, two ports) SRS transmission. Additionally, in the example of FIG. 5, a PUSCH 508 transmission is scheduled at slot 4 of the first carrier 502. In the current example, a time difference between the SRS 506 and the PUSCH 508 may be less than or equal to a time window designated for coherent UL MIMO. Furthermore, in the example of FIG. 5, it is assumed the PUSCH configuration and SRS configuration do not change between the SRS 506 and the PUSCH 508. Therefore, the UE may satisfy the set of conditions for coherent UL MIMO. That is, the SRS 506 and the PUSCH 508 may be scheduled for transmission from the same set of antenna ports with coherent transmission characteristics.

Still, in the example of FIG. 5, the UE may not perform the coherent UL MIMO transmission because the UE performs a first Tx chain switch at time t1. The first Tx chain switch may be performed based on an implicit transmission switch indicator or an explicit transmission switch indicator received from a base station, as described above. Specifically, as shown in FIG. 5, after performing the first Tx chain switch, the UE dedicates one of the Tx chains (1-Tx) from the first carrier 502 to the second carrier 504, such that the UE may perform a single-port UL transmission at slot 1 of the second carrier 504. Following the first Tx chain switch, one of the two Tx chains is dedicated to the first carrier 502.

Furthermore, as shown in FIG. 5, at time t2, the UE may perform a second UL Tx switch to dedicate both Tx chains to the first carrier 502. Based on the second UL Tx switch, the PUSCH 508 may be a multi-port transmission. Still, based on the first Tx switch scheduled between the scheduled SRS 506 and the PUSCH 508, the UE may not perform a coherent UL MIMO transmission. That is, the PUSCH 508 may not be transmitted with the coherent transmission characteristics by two or more antenna ports of the UE. Rather, the PUSCH 508 may be transmitted with one or more non-coherent transmission characteristics that exclude one or both of the first maximum allowable difference or the second maximum allowable difference set by the coherent transmission characteristics.

Figure 6:
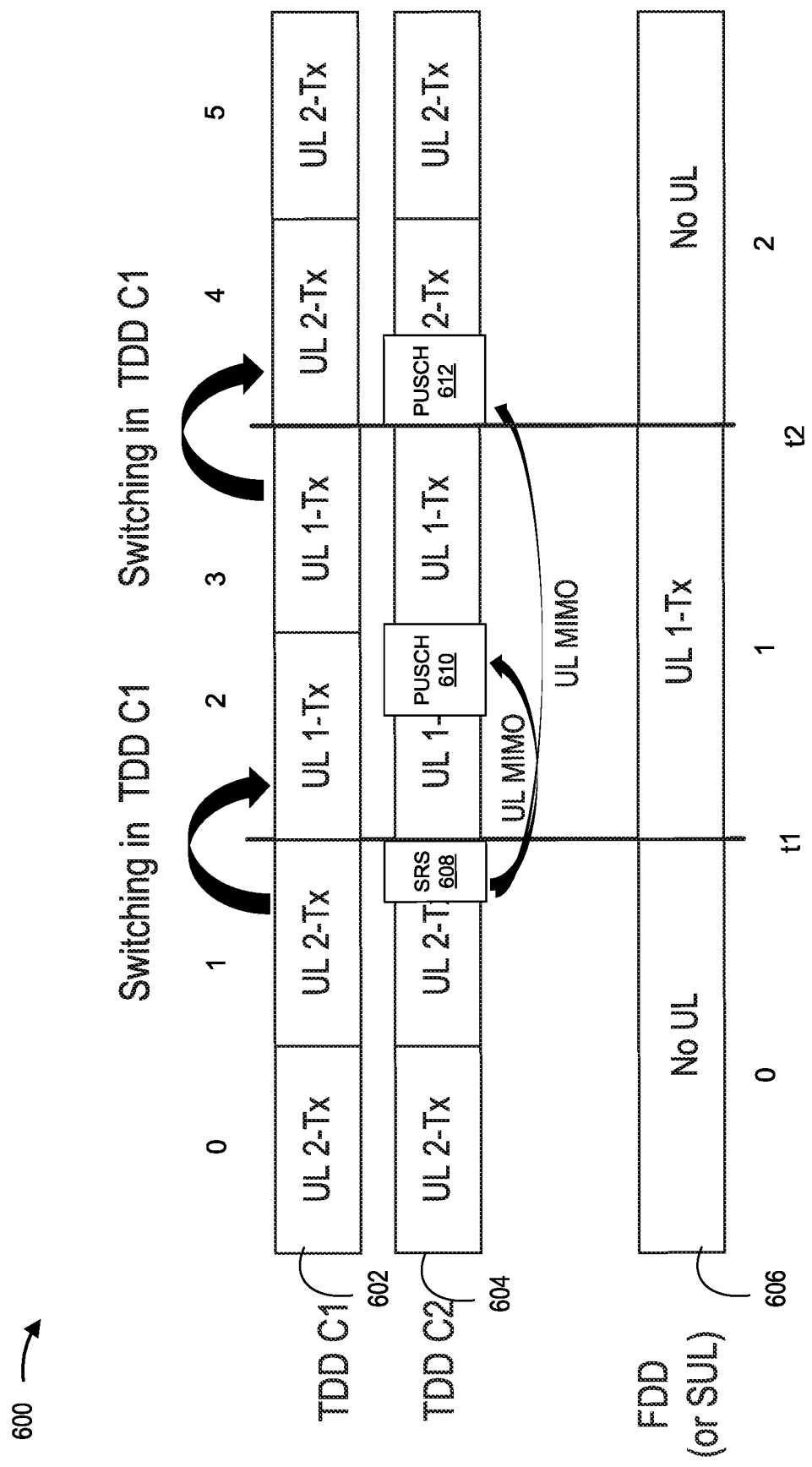
FIG. 6 is a block diagram illustrating an example of Tx chain switching, in accordance with aspects of the present disclosure.

FIG. 6 is a block diagram 600 illustrating an example of TX chain switching, in accordance with aspects of the present disclosure. In the example of FIG. 6, a UE (not shown in FIG. 6) may transmit on three carriers 602, 604, and 606. Additionally, the UE of FIG. 6 may support two Tx chains. In some examples, a first carrier 602 (TDD C1) and a second carrier 604 (TDD C2) may be TDD component carriers, and a third carrier 606 may be an FDD carrier or an SUL carrier. In the example of FIG. 6, it is assumed the UE has reported UL coherent MIMO capability in the first carrier 602.

As shown in FIG. 6, prior to time t1, the UE dedicates two UL Tx chains (shown as UL 2-Tx) to slots 0 and 1 of the first carrier 602 and the second carrier 604. Thus, an SRS 608 scheduled on the second carrier 604 may be a multi-antenna port (for example, two ports) SRS transmission. Additionally, in the example of FIG. 6, a first PUSCH 610 transmission is scheduled at slot 2 of the second carrier 604, and a second PUSCH 612 transmission is scheduled at slot 4 of the second carrier 604. In the current example, a time difference between the SRS 608 and first PUSCH 610, as well as a time difference between the SRS 608 and second PUSCH 612, may be less than or equal to a time window designated for coherent UL MIMO. Furthermore, in the example of FIG. 6, it is assumed a PUSCH configuration and SRS configuration do not change between the SRS 608, the first PUSCH 610, and the second PUSCH 612. Therefore, the UE may satisfy the set of conditions for coherent UL MIMO. That is, the SRS 608 and the first PUSCH 610 may be scheduled for transmission from the same set of antenna ports with coherent transmission characteristics. Additionally, the SRS 608 and the second PUSCH 612 may be scheduled for transmission from the same set of antenna ports with coherent transmission characteristics.

Still, in the example of FIG. 6, the UE may not perform the coherent UL MIMO transmission on the second carrier 604 because the UE performs a first Tx chain switch at time t1 on the first carrier 602. That is, the first Tx chain switch is scheduled between the scheduled SRS 608 and both the first PUSCH 610 and the second PUSCH 612. The first Tx chain switch may be performed based on an implicit transmission switch indicator or an explicit transmission switch indicator received from a base station, as described above. In some examples, a Tx chain switch on one component carrier may affect UL MIMO coherency on a second component carrier. As shown in FIG. 6, after performing the first Tx chain switch, the UE dedicates one of the Tx chains (1-Tx) from the first carrier 602 and second carrier 604 to the third carrier 606, such that the UE may perform a single-port UL transmission at slot 1 of the third carrier 606. Following the first Tx chain switch, one of the two Tx chains is dedicated to the first carrier 602 and the second carrier 604.

Furthermore, as shown in FIG. 6, at time t2, the UE may perform a second UL Tx switch to dedicate both Tx chains to the first carrier 602 and second carrier 604. Based on the second UL Tx switch, the second PUSCH 612 may be a multi-port transmission. Still, based on the first Tx switch, the UE may not perform a coherent UL MIMO transmission. That is, neither the first PUSCH 610 nor the second PUSCH 612 may be transmitted with the coherent transmission characteristics by two or more antenna ports of the UE. Rather, the first PUSCH 610 and the second PUSCH 612 may be transmitted with one or more non-coherent transmission characteristics that exclude one or both of the first maximum allowable difference or the second maximum allowable difference set by the coherent transmission characteristics.

Figure 7:
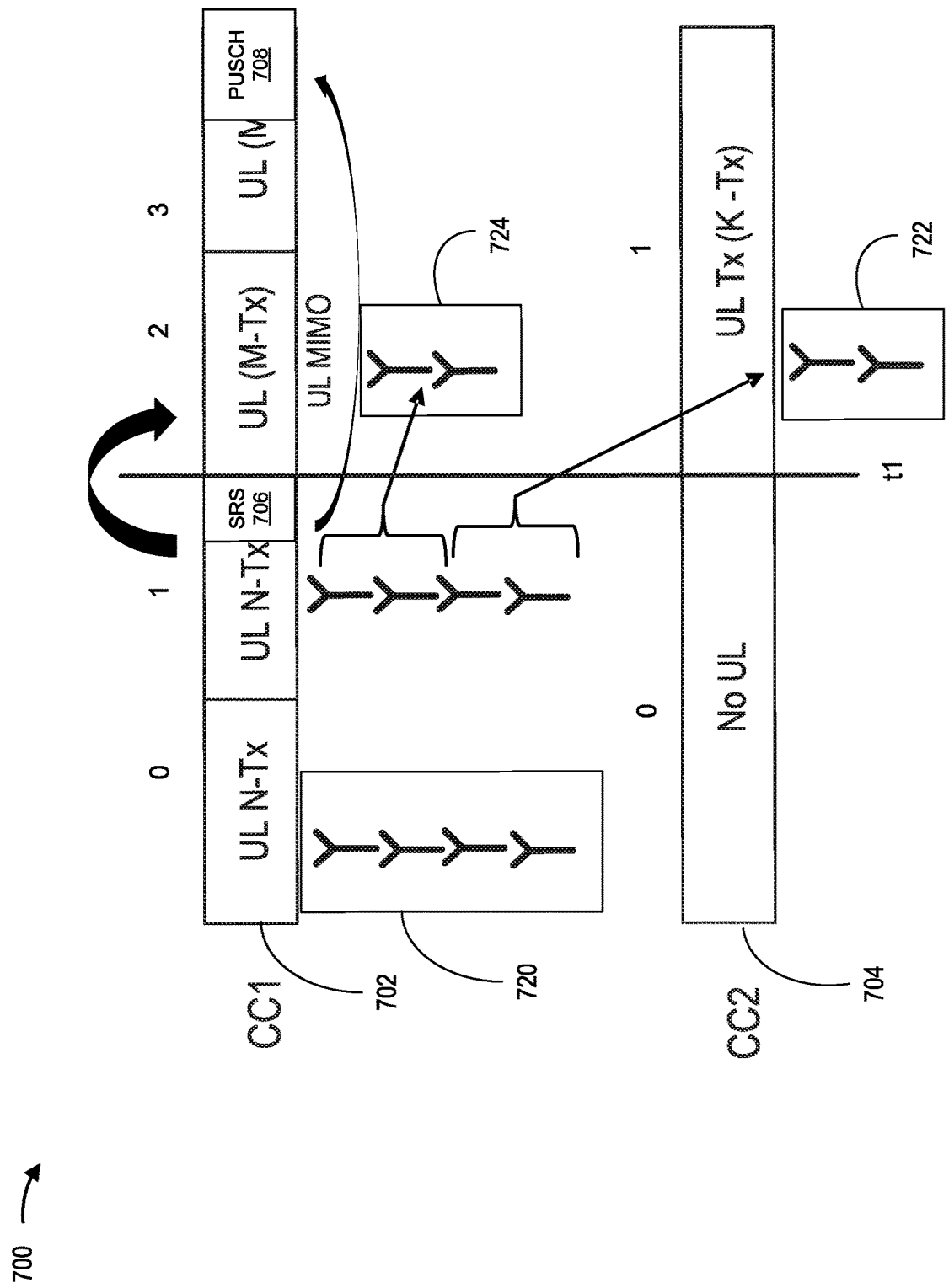
FIG. 7 is a block diagram illustrating an example of Tx chain switching, in accordance with aspects of the present disclosure.

FIG. 7 is a block diagram 700 illustrating an example of Tx chain switching, in accordance with aspects of the present disclosure. In the example of FIG. 7, a UE (not shown in FIG. 7) may transmit on two carriers 702, 704. In some examples, the first carrier 702 (CC1) and the second carrier 704 (CC2) may be component carriers operating on the same band or carriers operating on different bands. In the example of FIG. 7, it is assumed the UE has reported UL coherent MIMO capability in the first carrier 702.

In some implementations, UL MIMO coherency may be specified to all antenna ports or a subset of the antenna ports. In the example of FIG. 7, the UE may support a total of N Tx chains, where N is a sum of K UL MIMO ports in the first carrier 702 and M is the UL MIMO ports in the second carrier 704. Specifically, as shown in FIG. 7, N is equal to four. That is, the UE may support four UL Tx chains.

As shown in FIG. 7, prior to time t1, the UE dedicates four ports 720 to the first carrier 702, such that four UL Tx chains (shown as UL N-Tx) are dedicated to slots 0 and 1 of the first carrier 702. Thus, an SRS 706 may be a multi-antenna port (for example, four ports) SRS transmission. Additionally, in the example of FIG. 7, a PUSCH 708 transmission is scheduled at slot 3 of the first carrier 702. In the current example, a time difference between the SRS 706 and the PUSCH 708 may be less than or equal to a time window designated for coherent UL MIMO communications. Furthermore, in the example of FIG. 7, it is assumed the PUSCH configuration and SRS configuration do not change between the SRS 706 and the PUSCH 708. Therefore, the UE may satisfy the set of conditions for coherent UL MIMO. That is, the SRS 706 and the PUSCH 708 may be scheduled for transmission from the same set of antenna ports with coherent transmission characteristics.

Still, in the example of FIG. 7, the UE performs a Tx chain switch at time t1. The Tx chain switch may be performed based on an implicit transmission switch indicator or an explicit transmission switch indicator received from a base station, as described above. In some examples, the UE may switch a subset of all ports dedicated to a carrier to another carrier. In such examples, as shown in FIG. 7, based on the Tx chain switch, the UE switches two ports 722 to the second carrier 704, and two ports 724 remain dedicated to the first carrier 702. As such, the second carrier 704 may use two Tx chains (K-Tx), and the first carrier 702 may use two Tx chains (M-Tx).

In some implementations, the UL MIMO coherency may be unaffected in the two ports 724 that remain dedicated to the first carrier 702. In such implementations, the PUSCH 708 may be transmitted with the coherent transmission characteristics from the two ports 724 that remain dedicated to the first carrier 702. Additionally, in such implementations, the UL MIMO coherency of the two ports 722 switched to the second carrier 704 may be affected. That is, a transmission on the two ports 722 switched to the second carrier 704 may not be scheduled with the coherent transmission characteristics.

In other implementations, based on the Tx chain switch at time t1, the coherency of all ports 722 and 724 may be affected. In such implementations, the PUSCH 708 may not be transmitted with the coherent transmission characteristics by the two ports 724 that remain dedicated to the first carrier 702. Rather, the PUSCH 708 may be transmitted with one or more non-coherent transmission characteristics that exclude one or both of the first maximum allowable difference or the second maximum allowable difference set by the coherent transmission characteristics. In other implementations, the coherency of the switched ports 722 and dedicated ports 724 may be based on a capability of the UE.

As described, the coherency of one or more ports may be affected based on the UL Tx switch. To mitigate communication errors, it may be desirable to identify ports that remain coherent, such that appropriate coherency characteristics may be applied to the ports. In some implementations, the UE reports the coherency characteristics, or a codebook subset restriction, that may be applicable to one or more ports. In some such implementations, the UE may report the coherency characteristics via UL media access control-control element (MAC-CE) reporting. Alternatively, in other implementations, the coherency characteristics may be implicitly determined. For example, if two out of four ports remain coherent, the coherent ports may be the first two ports out of a set of four ports.

Aspects of the present disclosure are not limited to SRS and PUSCH transmissions. Other types of transmissions are also contemplated. In some examples, the transmissions may be sidelink transmissions. In some such examples, the uplink transmission may be a PSSCH, and the RS may be an SL-RS or a channel state information-RS (CSI-RS).

Figure 8:
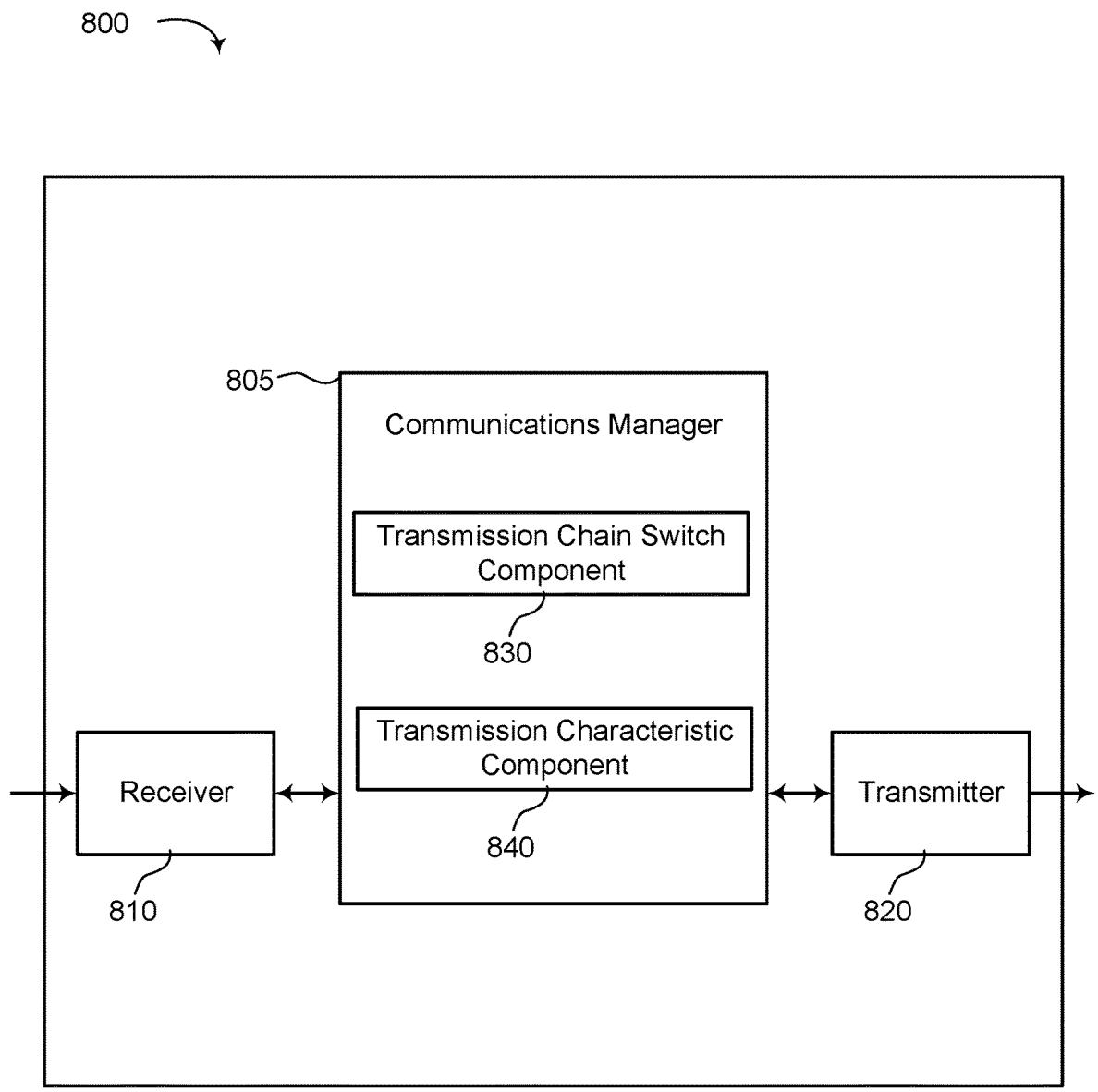
FIG. 8 is a block diagram illustrating an example of a wireless communication device that supports transmitting a communication based on coherent transmission characteristics or one or more non-coherent transmission characteristics, in accordance with aspects of the present disclosure.

FIG. 8 is a block diagram illustrating an example of a wireless communication device 800 that supports transmitting a communication based on coherent transmission characteristics or one or more non-coherent transmission characteristics, in accordance with aspects of the present disclosure. The device 800 may be an example of aspects of a UE 120 described with reference to FIG. 1. In some examples, the device 800 may be an example of a UE, as described with reference to FIGS. 3-7. The wireless communication device 800 may include a receiver 810, a communications manager 805, a transmitter 820, a transmission chain switch component 830, and a transmission characteristic component 840, which may be in communication with one another (for example, via one or more buses). In some examples, the wireless communication device 800 is configured to perform operations, including operations of the process 900 described below with reference to FIG. 9.

In some examples, the wireless communication device 800 can include a chip, chipset, package, or device that includes at least one processor and at least one modem (for example, a 5G modem or other cellular modem). In some examples, the communications manager 805, or its subcomponents, may be separate and distinct components. In some examples, at least some components of the communications manager 805 are implemented at least in part as software stored in a memory. For example, portions of one or more of the components of the communications manager 805 can be implemented as non-transitory code executable by the processor to perform the functions or operations of the respective component.

The receiver 810 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 110 described with reference to FIG. 1.

The received information may be passed on to other components of the device 800. The receiver 810 may be an example of aspects of the receive processor 258 described with reference to FIG. 2. The receiver 810 may include a set of radio frequency (RF) chains that are coupled with or otherwise utilize a set of antennas (for example, the set of antennas may be an example of aspects of the antennas 252a through 252r described with reference to FIG. 2).

The transmitter 820 may transmit signals generated by the communications manager 805 or other components of the wireless communication device 800. In some examples, the transmitter 820 may be collocated with the receiver 810 in a transceiver. The transmitter 820 may be an example of aspects of the transmit processor 284 described with reference to FIG. 2. The transmitter 820 may be coupled with or otherwise utilize a set of antennas (for example, the set of antennas may be an example of aspects of the antennas 252a through 252r described with reference to FIG. 2), which may be antenna elements shared with the receiver 810. In some examples, the transmitter 820 is configured to transmit control information in a physical uplink control channel (PUCCH) and data in a PUSCH.

The communications manager 805 may be an example of aspects of the controller/processor 280 described with reference to FIG. 2. The communications manager 805 may include the transmission chain switch component 830 and the transmission characteristic component 840. In some implementations, working in conjunction with the transmitter 820, the transmission characteristic component 840 may transmit, to a base station, an uplink capability message indicating a coherent uplink MIMO capability associated with coherent transmission characteristics. Additionally, working in conjunction with the receiver 810, the transmission chain switch component 830 receives, from the base station, a switch parameter that configures the UE for a transmission chain switch. Furthermore, working in conjunction with the receiver 810, the transmission chain switch component 830 receives, from the base station, a switching message that triggers the transmission chain switch between an RS transmission and a scheduled data communication. Additionally, working in conjunction with one or both of the transmitter 820 or the transmission chain switch component 830, the transmits the transmission characteristic component 840 transmits the data communication according to one or more non-coherent transmission characteristics based on the transmission chain switch being triggered between the RS transmission and the scheduled data communication.

Figure 9:
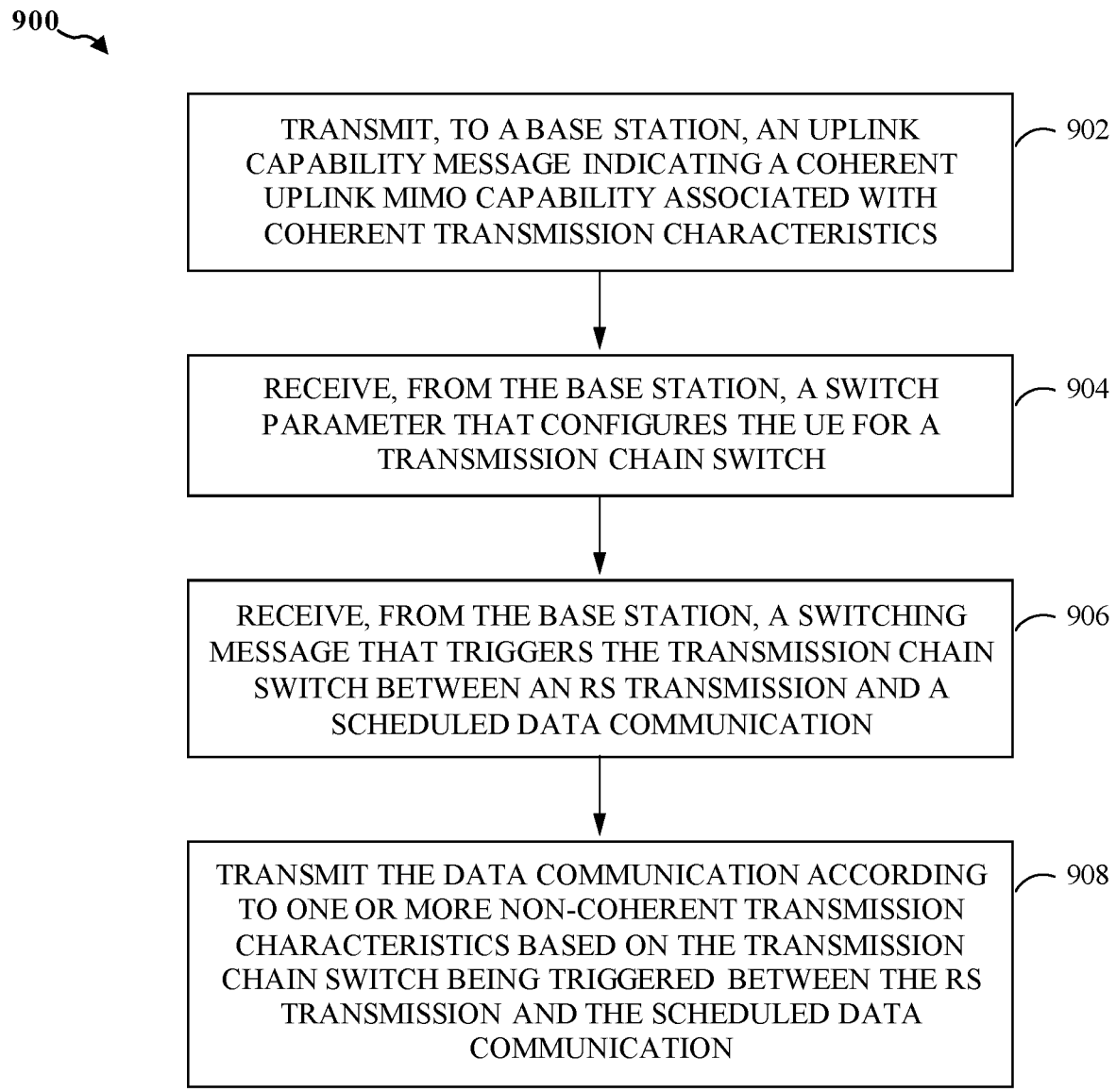
FIG. 9 is a flow diagram illustrating an example process performed, for example, by a user equipment (UE), in accordance with various aspects of the present disclosure.

FIG. 9 is a flow diagram illustrating an example process 900 performed, for example, by a UE 120, in accordance with various aspects of the present disclosure. For example, operations of the process 900 may be performed by a communications manager 805 as described with reference to FIG. 8. In some examples, a UE may execute a set of instructions to control the functional elements of the UE to perform the operations or functions described below. Additionally, or alternatively, a UE may perform aspects of the operations or functions described below using special-purpose hardware.

As shown in FIG. 9, in block 902, the process 900 transmits, to a base station, an uplink capability message indicating a coherent uplink MIMO capability associated with coherent transmission characteristics. At block 904, the process 900 receives, from the base station, a switch parameter that configures the UE for a transmission chain switch. At block 906, the process 900 receives, from the base station, a switching message that triggers the transmission chain switch between an RS transmission and a scheduled data communication. At block 908, the process 900 transmits the data communication according to one or more non-coherent transmission characteristics based on the transmission chain switch being triggered between the RS transmission and the scheduled data communication.

Figure 10:
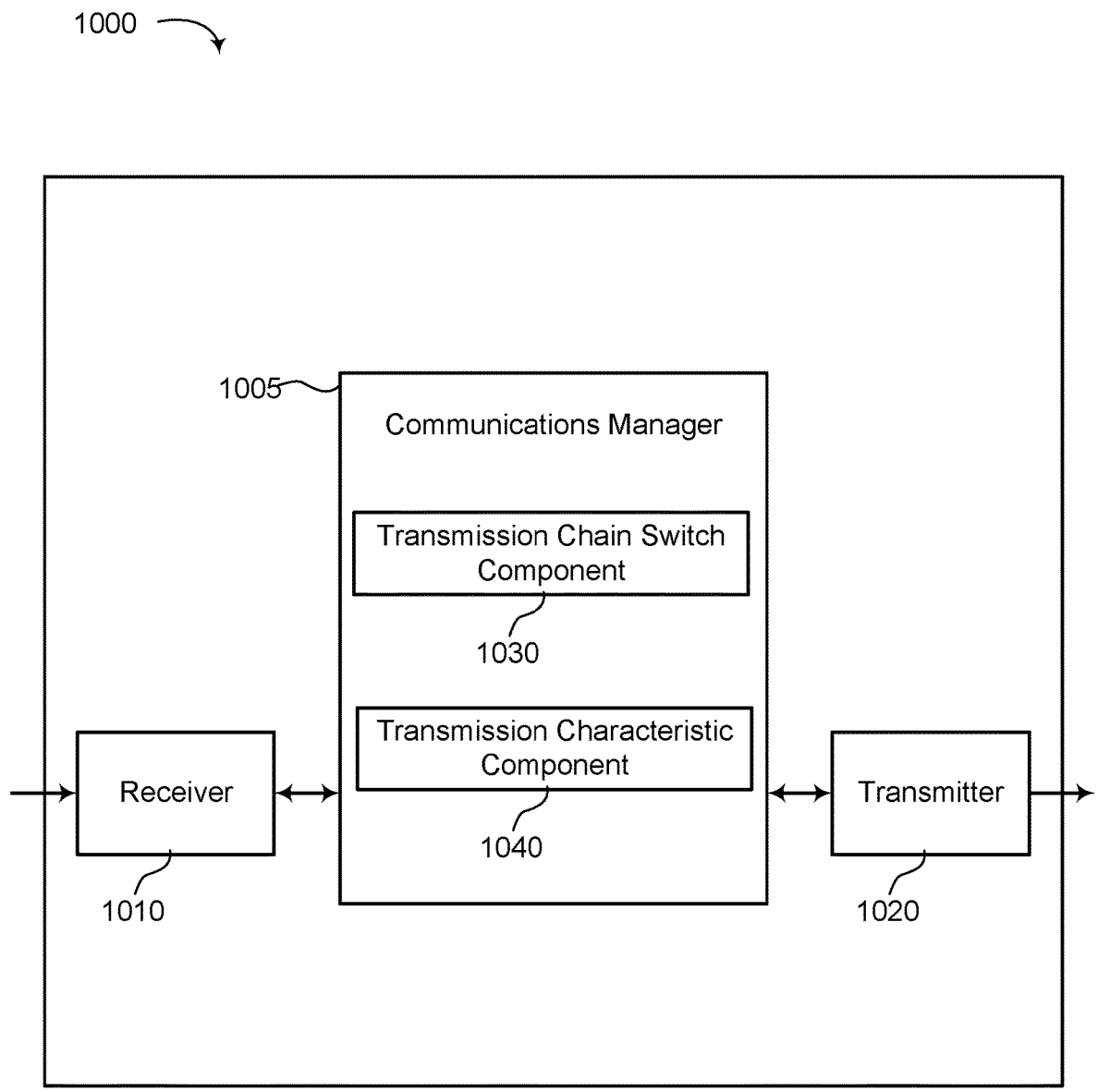
FIG. 10 is a block diagram illustrating an example of a wireless communication device that supports transmitting a communication based on coherent transmission characteristics or one or more non-coherent transmission characteristics, in accordance with aspects of the present disclosure.

FIG. 10 is a block diagram of a wireless communication device 1000 that coordinates inter-cell interference measurements, in accordance with aspects of the present disclosure. The wireless communication device 1000 may be an example of aspects of a base station 110 described with reference to FIGS. 1 and 2. The wireless communication device 1000 may include a receiver 1010, a communications manager 1015, and a transmitter 1020, which may be in communication with one another (for example, via one or more buses). In some examples, the wireless communication device 1000 is configured to perform operations, including operations of the process 1100 described below with reference to FIG. 11.

In some examples, the wireless communication device 1000 can include a chip, system on chip (SoC), chipset, package, or device that includes at least one processor and at least one modem (for example, a 5G modem or other cellular modem). In some examples, the communications manager 1015, or its sub-components, may be separate and distinct components. In some examples, at least some components of the communications manager 1015 are implemented at least in part as software stored in a memory. For example, portions of one or more of the components of the communications manager 1015 can be implemented as non-transitory code executable by the processor to perform the functions or operations of the respective component.

The receiver 1010 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110 or a UE 120, described with reference to FIGS. 1 and 2.

The received information may be passed on to other components of the wireless communication device 1000. The receiver 1010 may be an example of aspects of the receive processor 238 described with reference to FIG. 2. The receiver 1010 may include a set of radio frequency (RF) chains that are coupled with or otherwise utilize a set of antennas (for example, the set of antennas may be an example of aspects of the antennas 234*a* through 234*t* described with reference to FIG. 2).

The transmitter 1020 may transmit signals generated by the communications manager 1015 or other components of the wireless communication device 1000. In some examples, the transmitter 1020 may be collocated with the receiver 1010 in a transceiver. The transmitter 1020 may be an example of aspects of the transmit processor 220 described with reference to FIG. 2. The transmitter 1020 may be coupled with or otherwise utilize a set of antennas (for example, the set of antennas may be an example of aspects of the antennas 234*a* through 234*t*), which may be antenna elements shared with the receiver 1010. In some examples, the transmitter 1020 is configured to transmit control information in a physical uplink control channel (PUCCH) and data in a physical uplink shared channel (PUSCH).

The communications manager 1015 may be an example of aspects of the controller/processor 240 described with reference to FIG. 2. The communications manager 1015 includes a transmission chain switch component 1030 and a transmission characteristic component 1040. Working in conjunction with the receiver 1010, the transmission characteristic component 1040 receives, from a UE, an uplink capability message indicating a coherent uplink MIMO capability, at the UE, associated with coherent transmission characteristics. Additionally, working in conjunction with the transmitter 1020, the transmission chain switch component 1030 transmits, to the UE, a switch parameter that configures the UE for a transmission chain switch transmits, to the UE, a switch parameter that configures the UE for a transmission chain switch. Furthermore, working in conjunction with the transmitter 1020, the transmission chain switch component 1030 transmits, to the UE, a switching message that triggers the transmission chain switch between an RS transmission and a scheduled data communication. Additionally, working in conjunction with the receiver 1010, the transmission characteristic component 1040 may receive from the UE, the data communication according to one or more non-coherent transmission characteristics based on transmitting the switching message.

Figure 11:
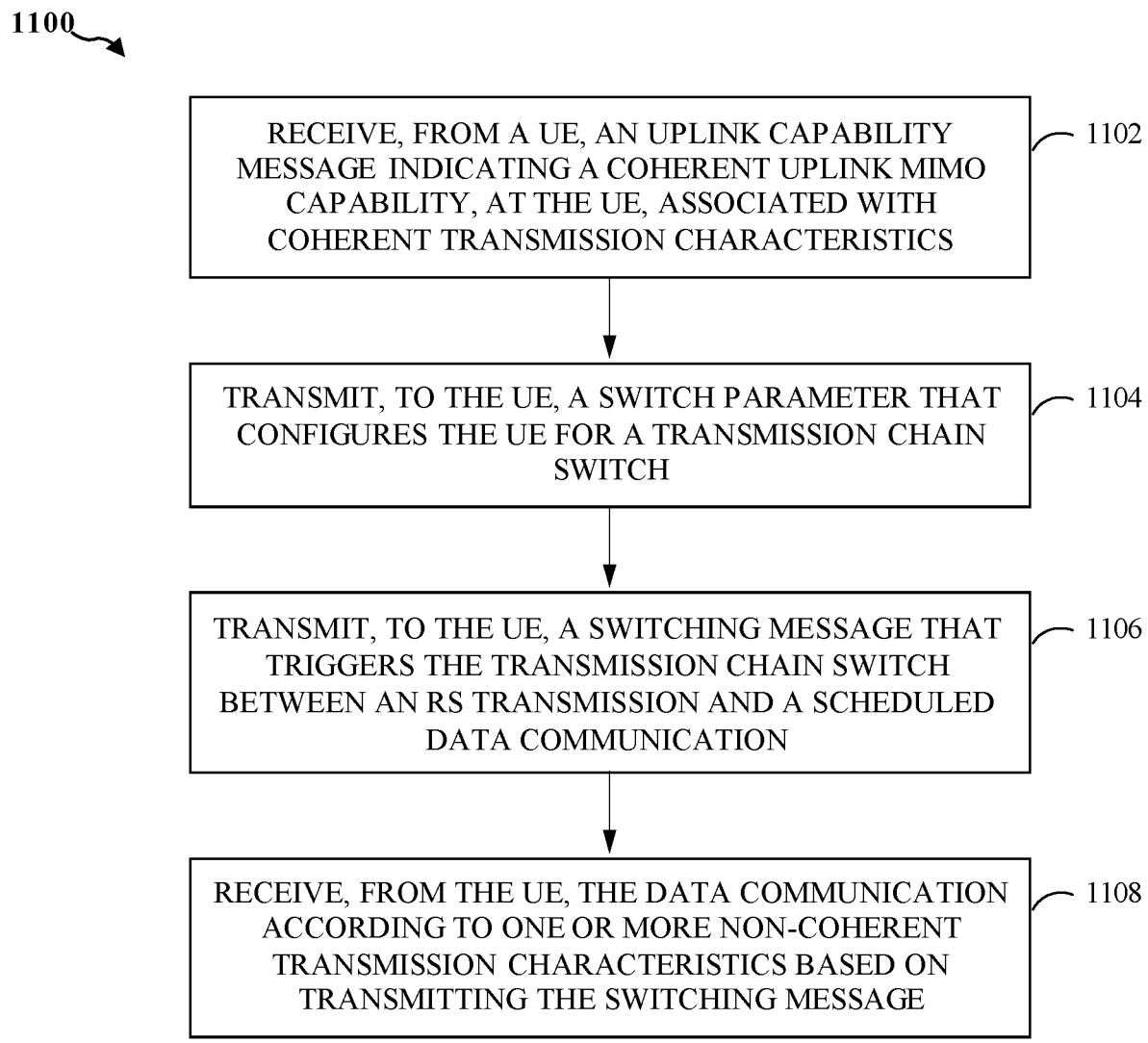
FIG. 11 is a flow diagram illustrating an example process performed, for example, by a base station, in accordance with various aspects of the present disclosure.

FIG. 11 is a flow diagram illustrating an example process 1100 performed, for example, by a base station 110, in accordance with various aspects of the present disclosure. For example, operations of the process 1100 may be performed by a communications manager 1005 as described with reference to FIG. 10. In some examples, a base station may execute a set of instructions to control the functional elements of the base station to perform the operations or functions described below. Additionally, or alternatively, a base station may perform aspects of the operations or functions described below using special-purpose hardware.

As shown in FIG. 11, in block 1102, the process 1100 receives, from a UE, an uplink capability message indicating a coherent uplink MIMO capability, at the UE, associated with coherent transmission characteristics. At block 1104, the process 1100 transmits, to the UE, a switch parameter that configures the UE for a transmission chain switch. At block 1106, the process 1100 transmits, to the UE, a switching message that triggers the transmission chain switch between an RS transmission and a scheduled data communication. At block 1108, the process 1100 receives, from the UE, the data communication according to one or more non-coherent transmission characteristics based on transmitting the switching message.

The following provides an overview of some Aspects of the present disclosure:

Aspect 1. A method for wireless communication by a UE, comprising: transmitting, to a base station, an uplink capability message indicating a coherent uplink MIMO capability associated with coherent transmission characteristics; receiving, from the base station, a switch parameter that configures the UE for a transmission chain switch; receiving, from the base station, a switching message that triggers the transmission chain switch between an RS transmission and a scheduled data communication; and transmitting the data communication according to one or more non-coherent transmission characteristics based on the transmission chain switch being triggered between the RS transmission and the scheduled data communication.

Aspect 2. The method of Aspect 1, wherein: the coherent transmission characteristics are associated with a coherent TPMI; and the one or more non-coherent transmission characteristics are associated with a non-coherent TPMI.

Aspect 3. The method of any one of Aspects 1-2, wherein the coherent transmission characteristics comprise both: a first maximum allowable difference between a first phase of the data communication and a second phase of a last RS transmission, and a second maximum allowable difference between a first power error associated with the data communication and a second power error associated with the last RS transmission.

Aspect 4. The method of Aspect 3, wherein the one or more non-coherent transmission characteristics exclude one or both of the first maximum allowable difference or the second maximum allowable difference.

Aspect 5. The method of any one of Aspects 1-4, further comprising switching a transmission chain of a plurality of transmission chains, associated with a first carrier, from the first carrier to a second carrier based on triggering the transmission switch.

Aspect 6. The method of Aspect 5, wherein: the RS transmission is associated with the first carrier; the data communication is transmitted on the first carrier; the first carrier is a time division duplex carrier; and the second carrier is a frequency division duplex carrier.

Aspect 7. The method of Aspect 5, wherein: the RS transmission is associated with a third carrier; the data communication is transmitted on the third carrier; the first carrier and the third carrier operate within a first band; and the second carrier operates within a second band.

Aspect 8. The method of any one of Aspects 1-7, wherein the switching message comprises: a request for a rank transmission on a first carrier or a second carrier; or RRC signaling, a MAC CE, or DCI.

Aspect 9. The method of any one of Aspects 1-8, wherein the RS is an SRS and the data communication is a PUSCH communication.

Aspect 10. The method of any one of Aspects 1-8, wherein: the data communication is transmitted on a sidelink channel; the RS is a sidelink SRS or a sidelink CS RS; and the data communication is a PSSCH.

Aspect 11. A method for wireless communication by a base station, comprising: receiving, from a UE, an uplink capability message indicating a coherent uplink MIMO capability, at the UE, associated with coherent transmission characteristics; transmitting, to the UE, a switch parameter that configures the UE for a transmission chain switch; transmitting, to the UE, a switching message that triggers the transmission chain switch between an RS transmission and a scheduled data communication; and receiving, from the UE, the data communication according to one or more non-coherent transmission characteristics based on transmitting the switching message.

Aspect 12. The method of claim 11, wherein: the coherent transmission characteristics are associated with a coherent TPMI; the one or more non-coherent transmission characteristics are associated with a non-coherent TPMI; and the method further comprises refraining transmission of the coherent TPMI based on transmitting the switching message.

Aspect 13. The method of any one of Aspects 11-12, wherein: the coherent transmission characteristics comprise both: a first maximum allowable difference between a first phase of the data communication and a second phase of a last RS transmission, and a second maximum allowable difference between a first power error associated with the data communication and a second power error associated with the last RS transmission.

Aspect 14. The method of Aspect 13, wherein the one or more non-coherent transmission characteristics exclude one or both of the first maximum allowable difference or the second maximum allowable difference.

Aspect 15. The method of any one of Aspects 11-14, wherein the transmission switch causes the UE to switch a transmission chain of a plurality of transmission chains, associated with a first carrier, from the first carrier to a second switch.

Aspect 16. The method of Aspect 15, wherein: the RS transmission is associated with the first carrier; the data communication is received on the first carrier; the first carrier is a time division duplex carrier; and the second carrier is a frequency division duplex carrier.

Aspect 17. The method of Aspect 15, wherein: the RS transmission is associated with a third carrier; the data communication is received on the third carrier, the first carrier and the third carrier operate within a first band, and the second carrier operates within a second band.

Aspect 18. The method of any one of Aspects 11-17, wherein the switching message comprises: a request for a rank transmission on a first carrier or a second carrier; or RRC signaling, a MAC CE, or DCI.

Aspect 19. The method of any one of Aspects 11-18, wherein the RS is a SRS and the data communication is a PUSCH communication.

Aspect 20. The method of any one of Aspects 11-18, wherein: the data communication is transmitted on a sidelink channel; the RS is a sidelink SRS or a sidelink CSI RS; and the data communication is a PSSCH communication.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and the like.

It will be apparent that systems and/or methods described may be implemented in different forms of hardware, firmware, and a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and methods based, at least in part, on the description.

Even though particular combinations of features are recited in the claims and disclosed in the specification, these combinations are not intended to limit the disclosure of various aspects. In fact, many of these features may be combined in ways not specifically recited in the claims and disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method for wireless communication by a user equipment (UE), comprising:
    transmitting, to a network node, an uplink capability message indicating a coherent uplink multiple-in-multiple-out (MIMO) capability associated with coherent transmission characteristics;
    receiving, from the network node, a switch parameter that configures the UE for uplink switching;
    receiving, from the network node, a switching message that triggers the uplink switching at a time period that is after a reference signal (RS) transmission and prior to a scheduled data communication; and
    transmitting, to the network node, data in accordance with the scheduled data communication according to one or more non-coherent transmission characteristics based on the uplink switching being triggered after the RS transmission and prior to the scheduled data communication.

2. The method of claim 1, wherein:
the coherent transmission characteristics are associated with a coherent transmitted precoding matrix indicator (TPMI); and
the one or more non-coherent transmission characteristics are associated with a non-coherent TPMI.

3. The method of claim 1, wherein the coherent transmission characteristics comprise both:
a first maximum allowable difference between a first phase of the data communication and a second phase of a last RS transmission, and
a second maximum allowable difference between a first power error associated with the data communication and a second power error associated with the last RS transmission.

4. The method of claim 3, wherein the one or more non-coherent transmission characteristics exclude one or both of the first maximum allowable difference or the second maximum allowable difference.

5. The method of claim 1, further comprising switching a transmission chain of a plurality of transmission chains, associated with a first carrier, from the first carrier to a second carrier based on triggering the uplink switching.

6. The method of claim 5, wherein:
the RS transmission is associated with the first carrier;
the data communication is transmitted on the first carrier;
the first carrier is a time division duplex carrier; and
the second carrier is a frequency division duplex carrier.

7. The method of claim 5, wherein:
the RS transmission is associated with a third carrier;
the data communication is transmitted on the third carrier;
the first carrier and the third carrier operate within a first band; and
the second carrier operates within a second band.

8. The method of claim 1, wherein the switching message comprises:
a request for a rank transmission on a first carrier or a second carrier; or
radio resource control (RRC) signaling, a medium access control (MAC) control element (CE), or downlink control information (DCI).

9. The method of claim 1, wherein the RS is a sounding reference signal (SRS) and the data communication is a physical uplink shared channel (PUSCH) communication.

10. The method of claim 1, wherein:
the data communication is transmitted on a sidelink channel;
the RS is a sidelink sounding reference signal (SRS) or a sidelink channel state information (CSI) RS; and
the data communication is a physical sidelink shared channel (PSSCH) communication.

11. A method for wireless communication by a network node, comprising:
receiving, from a user equipment (UE), an uplink capability message indicating coherent uplink multiple-in-multiple-out (MIMO) capability, at the UE, associated with coherent transmission characteristics;
transmitting, to the UE, a switch parameter that configures the UE for uplink switching;
transmitting, to the UE, a switching message that triggers the uplink switching at a time period that is after a reference signal (RS) transmission and prior to a scheduled data communication; and
receiving, from the UE, data in accordance with the scheduled data communication according to one or more non-coherent transmission characteristics based on transmitting the switching message.

12. The method of claim 11, wherein:
the coherent transmission characteristics are associated with a coherent transmitted precoding matrix indicator (TPMI);
the one or more non-coherent transmission characteristics are associated with a non-coherent TPMI; and
the method further comprises refraining transmission of the coherent TPMI based on transmitting the switching message.

13. The method of claim 11, wherein:
the coherent transmission characteristics comprise both:
a first maximum allowable difference between a first phase of the data communication and a second phase of a last RS transmission, and
a second maximum allowable difference between a first power error associated with the data communication and a second power error associated with the last RS transmission.

14. The method of claim 13, wherein the one or more non-coherent transmission characteristics exclude one or both of the first maximum allowable difference or the second maximum allowable difference.

15. The method of claim 11, wherein the uplink switching causes the UE to switch a transmission chain of a plurality of transmission chains, associated with a first carrier, from the first carrier to a second carrier.

16. The method of claim 15, wherein:
the RS transmission is associated with the first carrier;
the data communication is received on the first carrier;
the first carrier is a time division duplex carrier; and
the second carrier is a frequency division duplex carrier.

17. The method of claim 15, wherein:
the RS transmission is associated with a third carrier;
the data communication is received on the third carrier;
the first carrier and the third carrier operate within a first band, and
the second carrier operates within a second band.

18. The method of claim 11, wherein the switching message comprises:
a request for a rank transmission on a first carrier or a second carrier; or
radio resource control (RRC) signaling, a medium access control (MAC) control element (CE), or downlink control information (DCI).

19. The method of claim 11, wherein the RS is a sounding reference signal (SRS) and the data communication is a physical uplink shared channel (PUSCH) communication.

20. The method of claim 11, wherein:
the data communication is transmitted on a sidelink channel;
the RS is a sidelink sounding reference signal (SRS) or a sidelink channel state information (CSI) RS; and
the data communication is a physical sidelink shared channel (PSSCH) communication.

21. An apparatus for wireless communications at a user equipment (UE), comprising:
at least one processor;
at least one memory coupled with the at least one processor; and
instructions stored in the memory and operable, when executed by the processor, to cause the apparatus to:
transmit, to a network node, an uplink capability message indicating a coherent uplink multiple-in-multiple-out (MIMO) capability associated with coherent transmission characteristics;

receive, from the network node, a switch parameter that configures the UE for uplink switching;

receive, from the network node, a switching message that triggers the uplink switching a time period that is after a reference signal (RS) transmission and prior to a scheduled data communication; and transmit, to the network node, data in accordance with the scheduled data communication according to one or more non-coherent transmission characteristics based on the uplink switching being triggered after the RS transmission and prior to the scheduled data communication.

22. The apparatus of claim 21, wherein:
the coherent transmission characteristics are associated with a coherent transmitted precoding matrix indicator (TPMI); and
the one or more non-coherent transmission characteristics are associated with a non-coherent TPMI.

23. The apparatus of claim 21, wherein execution of the instructions cause the apparatus to switch a transmission chain of a plurality of transmission chains, associated with a first carrier, from the first carrier to a second carrier based on triggering the uplink switching.

24. The apparatus of claim 23, wherein:
the RS transmission is associated with the first carrier;
the data communication is transmitted on the first carrier;
the first carrier is a time division duplex carrier; and
the second carrier is a frequency division duplex carrier.

25. The method of claim 5, wherein:
the RS transmission is associated with a third carrier;
the data communication is transmitted on the third carrier,
the first carrier and the third carrier operate within a first band, and
the second carrier operates within a second band.

26. An apparatus for wireless communications at a network node, comprising:
at least one processor,
at least one memory coupled with the at least one processor; and
instructions stored in the memory and operable, when executed by the processor, to cause the apparatus to:
receive, from a user equipment (UE), an uplink capability message indicating a coherent uplink multiple-in-multiple-out (MIMO) capability, at the UE, associated with coherent transmission characteristics;
transmit, to the UE, a switch parameter that configures the UE for uplink switching;
transmit, to the UE, a switching message that triggers the uplink switching at a time period that is after a reference signal (RS) transmission and prior to a scheduled data communication; and
receive, from the UE, data in accordance with the scheduled data communication according to one or more non-coherent transmission characteristics based on transmitting the switching message.

27. The apparatus of claim 26, wherein:
the coherent transmission characteristics are associated with a coherent transmitted precoding matrix indicator (TPMI);
the one or more non-coherent transmission characteristics are associated with a non-coherent TPMI; and
execution of the instructions further cause the apparatus to refrain transmission of the coherent TPMI based on transmitting the switching message.

28. The apparatus of claim 26, wherein the uplink switching causes the UE to switch a transmission chain of a plurality of transmission chains, associated with a first carrier, from the first carrier to a second carrier.

29. The apparatus of claim 28, wherein:
the RS transmission is associated with the first carrier;
the data communication is received on the first carrier;
the first carrier is a time division duplex carrier; and
the second carrier is a frequency division duplex carrier.

30. The apparatus of claim 28, wherein:
the RS transmission is associated with a third carrier;
the data communication is received on the third carrier,
the first carrier and the third carrier operate within a first band, and
the second carrier operates within a second band.

* * * * *